US006287613B1

(12) United States Patent
Childress et al.

(10) Patent No.: US 6,287,613 B1
(45) Date of Patent: *Sep. 11, 2001

(54) PATCH BAG COMPRISING HOMOGENEOUS ETHYLENE/ALPHA-OLEFIN COPOLYMER

(75) Inventors: Blaine Clemons Childress, Inman; Ronald Dean Moffitt, Spartanburg, both of SC (US); Timothy Theodore Oberle, Varese (IT)

(73) Assignee: Cryovac Inc, Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/354,177

(22) Filed: Dec. 12, 1994

(51) Int. Cl.$^7$ ................................................ B65D 85/00
(52) U.S. Cl. .......................... 426/129; 426/106; 426/124; 426/127
(58) Field of Search .................................. 426/106, 129, 426/127, 410, 412, 415, 124; 206/497

(56) References Cited

U.S. PATENT DOCUMENTS

| | | | |
|---|---|---|---|
| Re. 35,285 | 6/1996 | Quacquarella et al. ............. 428/34.9 |
| 2,891,870 | 6/1959 | Selby et al. ............................. 99/174 |
| 2,902,371 | 9/1959 | Shorr ...................................... 99/171 |
| 3,161,629 | 12/1964 | Gorsich ................................... 260/94 |
| 3,383,746 | 5/1968 | Narduzzi et al. ........................ 29/33 |
| 3,454,441 | 7/1969 | Spruyt ................................. 156/244 |
| 3,552,090 | 1/1971 | Roberts et al. .......................... 53/71 |
| 3,628,576 | 12/1971 | Owen ..................................... 141/65 |
| 3,645,992 | 2/1972 | Elston ............................... 260/80.78 |
| 3,654,992 * | 4/1972 | Elston ................................ 526/169.2 |
| 3,741,253 | 6/1973 | Brax et al. ............................ 138/137 |
| 3,900,635 | 8/1975 | Funderburk, Jr. et al. .......... 428/213 |
| 4,119,267 | 10/1978 | Kydonieus ............................. 229/53 |
| 4,120,716 | 10/1978 | Bonet .................................. 156/272 |
| 4,136,205 | 1/1979 | Quattlebaum ........................ 426/412 |
| 4,239,111 | 12/1980 | Conant et al. ....................... 206/484 |
| 4,302,565 | 11/1981 | Goeke et al. .......................... 526/88 |
| 4,302,566 | 11/1981 | Karol et al. .......................... 526/125 |
| 4,306,041 | 12/1981 | Cozewith et al. ...................... 526/65 |
| 4,390,587 * | 6/1983 | Yoshimura et al. ................. 425/215 |
| 4,424,243 | 1/1984 | Nishimoto et al. .................... 428/36 |
| 4,429,079 | 1/1984 | Shibata et al. ....................... 525/240 |
| 4,456,646 | 6/1984 | Nishimoto et al. .................. 428/216 |
| 4,457,960 | 7/1984 | Newsome ............................... 428/35 |
| 4,469,753 | 9/1984 | Yoshimura et al. .............. 428/475.8 |
| 4,501,634 | 2/1985 | Yoshimura et al. ................. 156/244 |
| 4,532,189 | 7/1985 | Mueller ................................ 428/516 |
| 4,534,984 | 8/1985 | Kuehne ................................ 426/412 |
| 4,540,753 | 9/1985 | Cozewith et al. ...................... 526/88 |
| 4,551,380 | 11/1985 | Schoenberg ......................... 428/218 |
| 4,640,856 | 2/1987 | Ferguson et al. ..................... 428/36 |
| 4,701,432 | 10/1987 | Welborn, Jr. ........................ 502/113 |
| 4,755,403 | 7/1988 | Ferguson ............................... 428/35 |
| 4,765,857 | 8/1988 | Ferguson ............................. 156/229 |
| 4,770,731 | 9/1988 | Ferguson ............................. 156/229 |
| 4,801,486 * | 1/1989 | Quacquarella et al. ............. 428/34.9 |
| 4,833,024 | 5/1989 | Mueller ................................ 428/349 |
| 4,837,084 | 6/1989 | Warren ................................ 428/349 |
| 4,863,768 * | 9/1989 | Ishio et al. .......................... 428/34.9 |
| 4,863,769 | 9/1989 | Lustig et al. ........................ 428/34.9 |
| 4,865,902 | 9/1989 | Golike et al. ........................ 428/215 |
| 4,871,705 | 10/1989 | Hoel ..................................... 502/117 |
| 4,879,433 | 11/1989 | Gillett et al. ........................... 174/32 |
| 4,909,881 | 3/1990 | Garland ............................... 156/229 |
| 4,935,397 | 6/1990 | Chang ................................. 502/117 |
| 4,976,898 | 12/1990 | Lustig et al. .......................... 264/22 |
| 4,981,760 | 1/1991 | Naito et al. .......................... 428/523 |

(List continued on next page.)

FOREIGN PATENT DOCUMENTS

| | | |
|---|---|---|
| 111 602 | 6/1984 | (EP) . |
| 0416815 | 3/1991 | (EP) . |
| 0452920 | 10/1991 | (EP) . |
| 0495099 | 7/1992 | (EP) . |
| 0512740 | 11/1992 | (EP) . |
| 069 526 | 1/1993 | (EP) . |
| 597 502 | 5/1994 | (EP) . |
| 600 425 | 6/1994 | (EP) . |
| 0621205 | 10/1994 | (EP) . |
| 662 988 | 7/1995 | (EP) . |
| 662 989 | 7/1995 | (EP) . |
| 654460 | 6/1951 | (GB) . |

(List continued on next page.)

OTHER PUBLICATIONS

PW Technology Watch.
RD&E Dev. Order Form, 1.
Exact Linear Ethylene . . . , Antec '92, 154–158.
Homogeneous Catalysis, American Chem. Soc., VIII, IX, X,& 1.
A New Family of Linear . . . , '91 PL&C Conference, 289–296.
Seq. & Branching Dist . . . , Macromolecules '92, 2820–2827.
High–Speed Puncture . . . , ASTM D 3763–86, 174–178.
Unrestrained Linear . . . , ASTM D 2732–83, 368–371.
Polyolefins Gain Higher . . . , Modern Plastics, 46–49.
Exxon Cities Breakthrough, Modern Plastics, 61–62.
New Polyolefin Resins . . . , Modern Plastics, 16–18.
Enter a New Generation . . . , Plastics Technology, 15–17.
Novel Rheological . . . , Plastics Technology, 23 & 25.
The Metallocene Monitor, 2–6.
Deter. of Branching . . . , J. Polymer Sci., 441–455.
Cryovac Release Order, 1.

Primary Examiner—Lien Tran
(74) Attorney, Agent, or Firm—Rupert B. Hurley, Jr.

(57) ABSTRACT

A patch bag has a heat-shrinkable patch adhered to a heat-shrinkable bag, the heat-shrinkable patch comprising homogeneous ethylene/alpha-olefin copolymer. The patch bag can be made by adhering a patch film to a film which is thereafter converted to a bag, or by adhering the patch to a pre-formed bag. A packaged product has a meat product in the patch bag, the meat product comprising bone.

84 Claims, 7 Drawing Sheets

U.S. PATENT DOCUMENTS

| | | | |
|---|---|---|---|
| 5,001,016 | 3/1991 | Kondo et al. | 428/516 |
| 5,023,143 | 6/1991 | Nelson | 428/516 |
| 5,032,463 | 7/1991 | Smith | 428/520 |
| 5,055,328 | 10/1991 | Evert et al. | 428/34 |
| 5,055,438 | 10/1991 | Canich | 502/117 |
| 5,057,475 | 10/1991 | Canich et al. | 502/104 |
| 5,059,481 | 10/1991 | Lustig et al. | 428/39 |
| 5,064,797 | 11/1991 | Stricklen | 502/111 |
| 5,064,802 | 11/1991 | Stevens et al. | 502/155 |
| 5,084,534 | 1/1992 | Welborn, Jr. et al. | 526/160 |
| 5,088,228 | 2/1992 | Waldie, Jr. | 43/43 |
| 5,089,321 | 2/1992 | Chum et al. | 428/218 |
| 5,132,074 | 7/1992 | Isozaki et al. | 264/564 |
| 5,132,380 | 7/1992 | Stevens et al. | 526/126 |
| 5,206,075 | 4/1993 | Hodgson, Jr. | 428/216 |
| 5,234,731 | 8/1993 | Ferguson | 428/34.9 |
| 5,241,031 | 8/1993 | Mehta | 526/348 |
| 5,266,392 | 11/1993 | Land et al. | 428/224 |
| 5,272,016 | 12/1993 | Ralph | 428/516 |
| 5,272,236 | 12/1993 | Lai et al. | 526/348 |
| 5,278,272 | 1/1994 | Lai et al. | 526/348 |
| 5,279,872 | 1/1994 | Ralph | 428/34 |
| 5,283,128 | 2/1994 | Wilhoit | 428/516 |
| 5,298,326 * | 3/1994 | Norpoth et al. | 428/349 |
| 5,302,402 | 4/1994 | Dudenhoeffer et al. | 426/129 |
| 5,376,394 | 12/1994 | Dudenhoeffer et al. | 426/415 |
| 5,376,439 | 12/1994 | Hodgson et al. | 428/220 |
| 5,380,810 | 1/1995 | Lai et al. | 526/352 |
| 5,397,613 | 3/1995 | Georgelos | 428/36.7 |
| 5,397,640 | 3/1995 | Georgelos et al. | 428/349 |
| 5,403,668 | 4/1995 | Wilhoit | 428/500 |
| 5,420,220 | 5/1995 | Cheruvu et al. | 526/348.1 |
| 5,427,807 | 6/1995 | Chum et al. | 426/393 |
| 5,434,010 | 7/1995 | Smith et al. | 428/520 |
| 5,472,791 | 12/1995 | Landoni | 428/516 |
| 5,491,019 | 2/1996 | Kuo | 428/213 |
| 5,501,525 | 3/1996 | Cox et al. | 383/103 |
| 5,530,065 | 6/1996 | Farley et al. | 525/240 |
| 5,540,646 | 7/1996 | Williams et al. | 493/210 |
| 5,545,419 | 8/1996 | Brady et al. | 426/129 |
| 5,562,958 | 10/1996 | Walton et al. | 428/34.9 |
| 5,591,390 | 1/1997 | Walton et al. | 264/456 |
| 5,593,747 | 1/1997 | Georgelos | 428/36.7 |
| 5,604,043 | 2/1997 | Ahlgren | 428/518 |
| 5,614,297 | 3/1997 | Velazquez | 428/218 |
| 5,614,315 | 3/1997 | Kondo et al. | 428/332 |
| 5,658,625 | 8/1997 | Bradfute et al. | 428/34.9 |
| 5,677,383 | 10/1997 | Chum et al. | 525/240 |

FOREIGN PATENT DOCUMENTS

| | | |
|---|---|---|
| 1209825 | 10/1970 | (GB) . |
| 2 057 392 | 4/1981 | (GB) . |
| 2 097 324 | 11/1982 | (GB) . |
| 2 206 890 | 1/1989 | (GB) . |
| 2 291 402 | 1/1996 | (GB) . |
| 2291402 | 1/1996 | (GB) . |
| 102762/83 | 6/1983 | (JP) . |
| 63-175004 | 7/1988 | (JP) . |
| 58-37907 | 9/1997 | (JP) . |
| WO 87/03887 | 7/1987 | (WO) . |
| WO 90/03414 | 4/1990 | (WO) . |
| WO 92/14784 | 9/1992 | (WO) . |
| WO 93/03093 | 2/1993 | (WO) . |
| WO 93/08221 | 4/1993 | (WO) . |
| WO 93/12151 | 6/1993 | (WO) . |
| 94/06857 | 3/1994 | (WO) . |
| WO 94/07954 | 4/1994 | (WO) . |
| WO 94/09060 | 4/1994 | (WO) . |
| 95/00333 | 1/1995 | (WO) . |
| WO 95/32235 | 11/1995 | (WO) . |

* cited by examiner

PATCH BAG COMPRISING HOMOGENEOUS ETHYLENE/ALPHA-OLEFIN COPOLYMER

FIELD OF THE INVENTION

The present invention relates to packages for the packaging of bone-in meat products. More particularly, the present invention relates to a bag having a protective patch adhered directly thereto, the protective patch preventing, or reducing, puncture of the bag by exposed bone from a meat product within the bag.

BACKGROUND OF THE INVENTION

Heat-shrinkable thermoplastics are known to be useful as flexible packaging materials for vacuum packaging various foodstuffs, including meat. Such plastic materials, however, while generally suitable for packaging meat, understandably have difficulties in successfully packaging sharp or bony products. For example, attempts to package bone-in primal cuts of meat usually result in an unsatisfactorily large number of bag failures due to exposed bone puncturing the bag.

The use of cushioning materials such as paper, paper laminates, wax impregnated cloth, and various types of plastic inserts have proved to be less than totally satisfactory in solving the problem, as they require large expenditure of materials and labor, and are subject to shifting off of protruding bones. The preparation of special cuts of meat or close bone trim with removal of protruding bones has also been attempted. However, this is at best only a limited solution to the problem since it does not offer the positive protection necessary for a wide variety of commercial bone-in types of meat. Furthermore, removal of the bone is a relatively expensive and time-consuming procedure.

Some time ago, the use of a bag having a patch thereon, i.e., a "patch bag", became a commercially-preferred manner of packaging a number of bone-in meat products. One of the first commercially-utilized patch bags utilized a heat shrinkable bag and a patch composed of two laminated VALERON™ high density polyethylene ("HDPE") films, each film having been highly oriented in the machine direction. In the laminated patch, the machine direction of a first HDPE lamina was oriented about 90 degrees with respect to the machine direction of a second patch lamina.

The VALERON™ HDPE patch performed well in preventing punctures from exposed bone. However, upon packaging a meat product in a heat-shrinkable bag having such a patch thereon, the corners of the patch delaminated from the bag upon shrinkage of the bag, due to the fact that the patch would not shrink as the bag shrunk. Customers perceived the delamination of the patch corners from the bag to be highly undesirable. Furthermore, the highly oriented HDPE films were opaque white due to the formation of voids during the orientation process.

Thus, the need arose for a patch which would provide the patch bag with a desired level of puncture-resistance, while at the same time being heat-shrinkable so that there would be no substantial delamination at the corners of the patch. Furthermore, although for some uses it was desirable to use an opaque patch, for other uses it was desirable to provide a substantially translucent or transparent patch.

Although ethylene/vinyl acetate copolymer ("EVA") was known to have the desired heat shrink properties for use in patches, it was discovered to lack the desired level of puncture-resistance obtainable using the VALERON™ HDPE patch. That is, EVA patches had to be much thicker than an HDPE patch in order to provide the same level of puncture-resistance. Furthermore, in addition to lacking the desired puncture-resistant character, EVA lacked abrasion-resistance, further diminishing its utility as the bulk polymer in the patch.

Surprisingly, linear low density polyethylene (LLDPE) was found to provide the combination of puncture-resistance, heat-shrinkability, abrasion-resistance, and even transparency, desired for use in a patch for patch bags. Within the last 10 years, patch bags having patches composed of LLDPE have come into widespread commercial use in the United States.

However, LLDPE has several drawbacks. For example, LLDPE is not easily processable as it causes high extruder back pressure if extrusion is attempted at relatively high speeds. Furthermore, because of its stiffness, LLDPE is difficult to orient, which necessitates that another polymer be blended with the LLDPE in order to permit the desired orientation of the LLDPE to provide a shrinkable patch. Furthermore, LLDPE will not heat-seal to itself, necessitating the use of another type of polymer if the patch is to be formed from a collapsed film tube, as is one of the most desirable processes for manufacturing patches.

Thus, it would be desirable to locate another polymer which can provide the combination of puncture-resistance and heat-shrinkability. Furthermore, it would be desirable that this other polymer also be capable of being manufactured as a substantially transparent film. Furthermore, it would be desirable if this other polymer was easier to extrude than LLDPE, had a stiffness low enough to avoid the need to blend a stiffness-reducing polymer therewith, and had the ability to be heat-sealed to itself.

SUMMARY OF THE INVENTION

The present invention is directed to the use of homogeneous ethylene/alpha-olefin copolymer in a patch for a patch bag. This homogeneous polymer has surprisingly been found to provide a combination of puncture-resistance and heat-shrinkability which is at least the equivalent of LLDPE. Furthermore, it has also surprisingly been found that this homogeneous polymer has about the same abrasion-resistance as LLDPE, and can be used to form a substantially transparent heat shrinkable patch. Thus, this homogeneous polymer has been discovered to provide an alternative to the use of LLDPE in patches for patch bags. At least some species of this homogeneous polymer are considerably easier to extrude than LLDPE. Furthermore, some species have a stiffness low enough to avoid the need to blend a stiffness reducing polymer therewith. Finally, at least some species of the polymer, when extruded into a tubular film, offer the further advantage of substantially better sealing to itself, relative to LLDPE.

As a first aspect, the present invention is directed to a patch bag comprising a heat-shrinkable patch adhered to a heat-shrinkable bag. The heat-shrinkable patch comprises a first heat-shrinkable film and the heat-shrinkable bag comprises a second heat-shrinkable film. The first heat-shrinkable film comprises a homogeneous ethylene/alpha-olefin copolymer.

Preferably, the patch bag further comprises an adhesive layer between the first heat-shrinkable film and the second heat-shrinkable film. Preferably, the homogeneous ethylene/alpha-olefin copolymer has a density of from about 0.87 to 0.94 g/cc, more preferably, 0.89 to 0.92. Preferably, the first heat-shrinkable film has a free shrink at 185° F. of from about 10 to 100 percent, more preferably 15 to 75 percent, and still more preferably, 20 to 60 percent. Preferably, the first heat-shrinkable film has a free shrink, at 185° F., of from about 40 to 120 percent of the free shrink of the second heat-shrinkable film; more preferably, from 40 to 100 percent.

Preferably, the homogeneous ethylene/alpha-olefin is present in the first heat-shrinkable film in an amount of from about 5 to 100 weight percent, based on the weight of the first heat-shrinkable film; more preferably, from about 15 to 85 weight percent.

The first heat-shrinkable film can comprise a first homogeneous ethylene/alpha-olefin copolymer while the second heat-shrinkable film comprises a second homogeneous ethylene/alpha-olefin copolymer. The first and second homogeneous ethylene/alpha-olefin copolymers can be the same or different.

Preferably, the first heat-shrinkable film comprises two outer layers and two inner layers, the two outer layers being substantially identical in chemical composition and thickness, and the two inner layers being substantially identical in chemical composition and thickness. In one preferred embodiment, each of the two outer layers comprises the homogeneous ethylene/alpha-olefin in an amount of from about 1 to 100 weight percent, based on the weight of the outer layers. Furthermore, each of the two inner layers comprises the homogeneous ethylene/alpha-olefin in an amount of from about 1 to 100 weight percent, based on the weight of the inner layers. In an alternative embodiment, each of the two outer layers is composed of a composition substantially free of homogeneous ethylene/alpha-olefin copolymer, with the two inner layers comprising homogeneous ethylene/alpha-olefin copolymer. Preferably, the two substantially identical inner layers each comprise at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc. Preferably, the ethylene/vinyl ester copolymer comprises at least one member selected from the group consisting of ethylene/methyl acrylate copolymer, and ethylene/vinyl acetate copolymer, and the ethylene/vinyl acid copolymer comprises ethylene/methacrylic acid copolymer. Preferably, the two substantially identical outer layers comprise from about 10 to 80 weight percent of the weight of the first heat-shrinkable film.

As a second aspect, the present invention pertains to a packaged product, comprising a package and a meat product in the package. The package includes a patch bag comprising a heat-shrinkable patch adhered to a heat-shrinkable bag, the heat-shrinkable patch comprising a first heat-shrinkable film and the heat-shrinkable bag comprising a second heat-shrinkable film, the first heat-shrinkable film comprising a homogeneous ethylene/alpha-olefin copolymer. The meat product comprises bone. Preferably, the meat product comprises at least one member selected from the group consisting of ham, spareribs, picnic, back rib, short loin, short rib, whole turkey, pork loin.

DETAILED DESCRIPTION OF THE INVENTION

Figure 1:
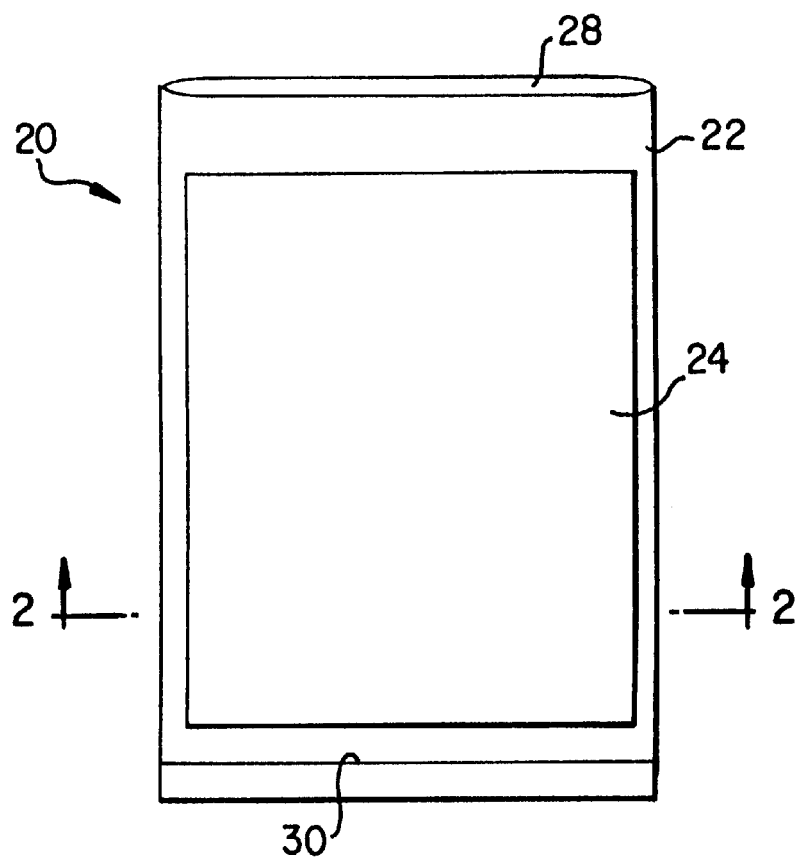
FIG. 1 illustrates a schematic view of a preferred end-seal patch bag according to the present invention, in a lay-flat view.

A film seal layer, i.e., sealing layer or heat seal layer, is an outer film layer, or layers, involved in the sealing of the film to itself, another film layer of the same or another film, and/or another article which is not a film. In general, up to the outer 3 mils of a film can be involved in the sealing of the film to itself or another layer. With respect to packages having only fin-type seals, as opposed to lap-type seals, the sealant layer includes the inside film layer of a package, as well as supporting layers adjacent this sealant layer, the inside layer frequently also serving as a food contact layer in the packaging of foods.

In general, a sealant layer to be sealed by heat-sealing can comprise any thermoplastic polymer; preferably, the heat-sealing layer comprises, for example, thermoplastic polyolefin, thermoplastic polyamide, thermoplastic polyester, and thermoplastic polyvinyl chloride; more preferably, thermoplastic polyolefin; still more preferably, thermoplastic polyolefin having less than 60 weight percent crystallinity. Preferred sealant compositions are the same as the compositions for the abuse layer, as set forth below.

A bag seal is a seal of a first region of a film surface to a second region of a film surface, wherein the seal is formed by heating the regions to at least their respective seal initiation temperatures. The heating can be performed by any one or more of a wide variety of manners, such as using a heated bar, hot air, infrared radiation, ultrasonic sealing, etc.

A film barrier layer is a layer which serves as a barrier to one or more gases. Oxygen (i.e., $O_2$) barrier layers can comprise, for example, ethylene/vinyl alcohol copolymer, polyvinyl chloride, polyvinylidene chloride, polyamide, polyester, polyacrylonitrile, etc., as known to those of skill in the art; preferably, the oxygen barrier layer comprises ethylene/vinyl alcohol copolymer, polyvinylidene chloride, and polyamide; more preferably, vinylidene chloride/methyl acrylate copolymer, as known to those of skill in the art.

As used herein, "EVOH" refers to ethylene/vinyl alcohol copolymer. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

A film abuse layer is a film layer which serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, the abuse layer comprises polymer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer, etc. as known to those of skill in the art; more preferably, in the patch bag of the present invention the abuse layer of the patch comprises homogeneous ethylene/alpha olefin copolymer.

A film core layer is an inner film layer, i.e., internal film layer, which has a primary function other than serving as an adhesive or compatibilizer for adhering two layers to one another. Usually, the core layer, or layers, provides the multilayer film with a desired level of strength, i.e., modulus, and/or optics, and/or added abuse resistance, and/or specific impermeability.

A film skin layer is an outside film layer, in a multilayer film used in the packaging of a product. The skin layer is subject to abuse. Accordingly, the preferred polymers for the skin layer are the same as the preferred polymers for the abuse layer.

A film tie layer is an inner layer of a multilayer film, this inner layer having the primary purpose of adhering two layers of the film to one another. Tie layers generally comprise any polymer having a polar group grafted thereon, so that the polymer is capable of covalent bonding to polar polymers such as polyamide and ethylene/vinyl alcohol copolymer; preferably, tie layers comprise at least one member selected from the group consisting of polyolefin, modified polyolefin, ethylene/vinyl acetate copolymer, modified ethylene/vinyl acetate copolymer, and homogeneous ethylene/alpha-olefin copolymer; more preferably, tie layers comprise at least one member selected from the group consisting of anhydride modified grafted linear low density polyethylene, anhydride grafted low density polyethylene, homogeneous ethylene/alpha-olefin copolymer, and anhydride grafted ethylene/vinyl acetate copolymer.

A film laminate is a film made by bonding together two or more layers of film or other materials. Lamination can be accomplished by joining layers with adhesives, joining with heat and pressure, and even spread coating and extrusion coating. Film laminates also include coextruded multilayer films comprising one or more tie layers.

A heat-shrinkable film is typically made by first being stretched at an elevated temperature (the orientation temperature) which is below the melt temperature of at least one polymer present in the film. During the orientation process, the film is generally biaxially oriented by being "stretched" in the transverse direction, and "drawn" in the machine direction. Preferably, the application of substantial cooling occurs at some point downstream of the upstream roller, the point of cooling being dependent upon material properties and cooling rates. Ultimately, this type of process results in a film which is heat-shrinkable in both the transverse and longitudinal directions. Upon subsequently heating unrestrained, unannealed, oriented polymer-containing material to its orientation temperature, heat shrinkage is produced almost to the original unstretched, i.e., pre-oriented dimensions. The orientation in oriented films can be produced in one or more of a variety of manners.

The orientation ratio of a film is the multiplication product of the extent to which the plastic film material is expanded in several directions, usually two directions perpendicular to one another. "Drawing" is orientation in the machine direction, while "stretching" is orientation in the transverse direction. For films extruded through an annular die, stretching is obtained by "blowing" the film to produce a bubble. Drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the term "polymer", refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers in the films used in accordance with the present invention, can be prepared in accordance with any suitable polymerization process, including slurry polymerization, gas phase polymerization, and high pressure polymerization processes.

Slurry polymerization processes generally use superatmospheric pressures and temperatures in the range of 40°–100° C. In a slurry polymerization, a suspension of solid, particulate polymer is formed in a liquid polymerization medium to which are added ethylene and comonomers, and often hydrogen along with catalyst. The liquid employed in the polymerization medium can be an alkane, cycloalkane, or an aromatic hydrocarbon such as toluene, ethylbenzene or xylene. The medium employed should be liquid under the conditions of polymerization, and relatively inert. Preferably, hexane or toluene is employed.

Alternatively, gas-phase polymerization processes utilize superatmospheric pressure and temperature in the range of about 50°–120° C. Gas phase polymerization can be performed in a stirred or fluidized bed of catalyst and product particles, in a pressure vessel adapted to permit the separation of product particles from unreacted gases. Ethylene, comonomer, hydrogen and an inert diluent gas such as nitrogen can be introduced or recirculated so as to maintain the particles at temperatures of 50°–120° C. Triethylaluminum may be added as needed as a scavenger of water, oxygen, and other impurities. Polymer product can be withdrawn continuously or semicontinuously, at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

High pressure polymerization processes utilize a catalyst system comprising a cyclopentadienyl-transition metal compound and an alumoxane compound. It is important, in the high-pressure process, that the polymerization temperature be above about 120° C., but below the decomposition temperature of the polymer product. It is also important that the polymerization pressure be above about 500 bar (kg/cm$^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

A heterogeneous polymer is a polymerization reaction product having a relatively wide variation in molecular weight and relatively wide variation in composition distribution, i.e., typical polymers prepared, for example, using conventional Ziegler-Natta catalysts. Although there are a few exceptions (such as Ziegler-Natta catalyzed TAFMER™ linear homogeneous ethylene/alpha-olefin copolymers produced by Mitsui Petrochemical Corporation), heterogeneous polymers typically contain a relatively wide variety of chain lengths and comonomer percentages.

In contrast to heterogeneous polymers, homogeneous polymers are polymerization reaction products of relatively narrow molecular weight distribution and relatively narrow composition distribution. Homogeneous polymers are useful in various layers of the patch bag of the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.,* Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. Nos. 5,206,075, 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. Nos. 5,272,236, to LAI, et. al., and 5,278,272, to LAI, et. al., both of which are hereby incorporated by reference thereto, in their respective entireties.

The term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., acrylic acid, methacrylic acid, isobutyl acrylate, or the like, or a derivative thereof such as the anhydride, ester, metal salt, or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "ethylene/alpha-olefin copolymer", "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

Modified polymers, such as "modified ethylene/vinyl acetate copolymer", and "modified polyolefin" include such polymers having an anhydride functionality grafted thereon and/or copolymerized therewith and/or blended therewith. Preferably, such modified polymers have the anhydride functionality grafted on or polymerized therewith, as opposed to merely blended therewith.

The homogeneous ethylene/alpha-olefin copolymers useful in the bag film and patch film of the patch bag of the present invention include, for example, metallocene catalyzed polymers such as EXACT™ linear homogeneous ethylene/alpha-olefin copolymers obtainable from the Exxon Chemical Company, and TAFMER™ linear homogeneous ethylene/alpha-olefin resin obtainable from the Mitsui Petrochemical Corporation. All these homogeneous copolymers generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. For example, LLDPE has a density usually in the range of from about 0.91 grams per cubic centimeter to about 0.94 grams per cubic centimeter.

Another group of homogeneous ethylene/alpha-olefin copolymers are available from The Dow Chemical Company, and are known as AFFINITY™ long chain branched homogeneous ethylene/alpha-olefin copolymers. It has been discovered that AFFINITY™ long chain branch homogeneous ethylene/alpha-olefin copolymers are easier to process into films, relative to other homogeneous ethylene/alpha-olefin copolymers, such as EXACT™ linear homogeneous ethylene/alpha-olefin copolymers obtained from the Exxon Chemical Company. For this reason, among others, AFFINITY™ long chain branched homogeneous ethylene/alpha-olefin copolymers are preferred over EXACT™ linear homogeneous ethylene/alpha-olefin copolymers. Preferred long chain branched homogeneous ethylene/alpha-olefin copolymers have are those having a density of from about 0.87 to 0.94 g/cc, more preferably 0.89 to 0.92 g/cc. Long chain branched homogeneous ethylene/alpha-olefin copolymers are preferably produced using a metallocene-catalyzed polymerization reaction.

Although in the patch bag of the present invention the patch comprises homogeneous ethylene/alpha-olefin copolymer, the patch and/or the bag may further comprise heterogeneous ethylene/alpha-olefin copolymer. Several preferred heterogeneous ethylene/alpha olefin copolymer include: linear low density polyethylene (LLDPE), very low density polyethylene (VLDPE), and ultra low density polyethylene (ULDPE).

In general, both homogeneous and heterogeneous ethylene/alpha-olefin copolymers result from the copolymerization of from about 80 to 99 weight percent ethylene and from 1 to 20 weight percent alpha-olefin; preferably, from the copolymerization of from about 85 to 95 weight percent ethylene with 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the term "adhered" is inclusive of films which are directly adhered to one another using a heat seal or other means, as well as films which are adhered to one another using an adhesive which is between the two films.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

Extrusion is the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

Coextrusion is the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

The "machine direction" of a film is a direction along the length of the film, i.e., the direction in which the film is formed during extrusion and coating. In contrast, the "transverse direction" of a film is a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art. ASTM D 2732 is described in the 1990 *Annual Book of ASTM Standards*, Section 8, Plastics, Vol. 08.02, pp.368–371, which is hereby incorporated by reference thereto, in its entirety.

Although the films used in the patch bag according to the present invention can be monolayer films or multilayer films, the patch bag comprises at least two films laminated together. Preferably, the patch bag is comprised of films which together comprise a total of from 2 to 20 layers; more preferably, from 2 to 12 layers; and still more preferably, from 4 to 9 layers.

In general, the monolayer or multilayer films used in the patch bag of the present invention can have any total thickness desired, so long as the films provide the desired properties for the particular packaging operation in which the film is used, e.g. abuse-resistance (especially puncture-resistance), modulus, seal strength, optics, etc. However, for efficiency and conservation of resources, it is desirable to obtain the necessary puncture-resistance using the minimum patch thickness. Preferably, the film stock from which the patches are cut has a total thickness of from about 2 to 8 mils; more preferably, from about 3 to 6 mils. Furthermore, the patch film can be a monolayer film or a multilayer film. Several patch films described in detail below contain a total of 4, 6, and 14 layers.

Figure 2:
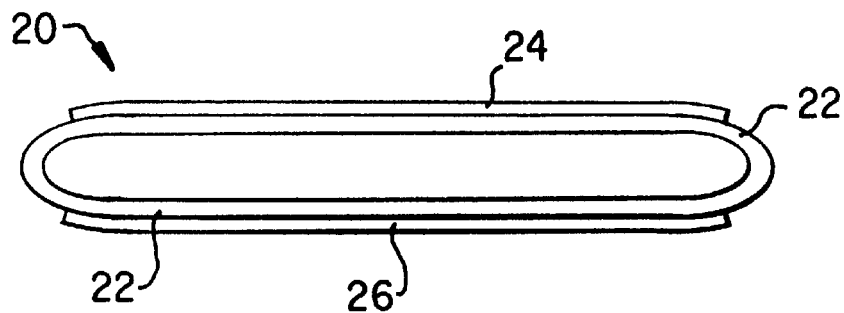
FIG. 2 illustrates a cross-sectional view of the end-seal patch bag illustrated in FIG. 1, taken through section 2—2 of FIG. 1.

FIG. 1 is a side-view illustration of a preferred end-seal patch bag 20, in a lay-flat position, this patch bag being in accord with the present invention; FIG. 2 is a cross-sectional view of patch bag 20 taken through section 2—2 of FIG. 1.

Viewing FIGS. 1 and 2 together, patch bag 20 comprises bag 22, front patch 24 (i.e., first patch 24), and rear patch 26 (i.e., second patch 26), open top 28, and end-seal 30. The designations of "front" and "back"/"rear" are merely with respect to that side of patch bag 20 which is up when patch bag 20 is in its lay-flat position.

Figure 3A:
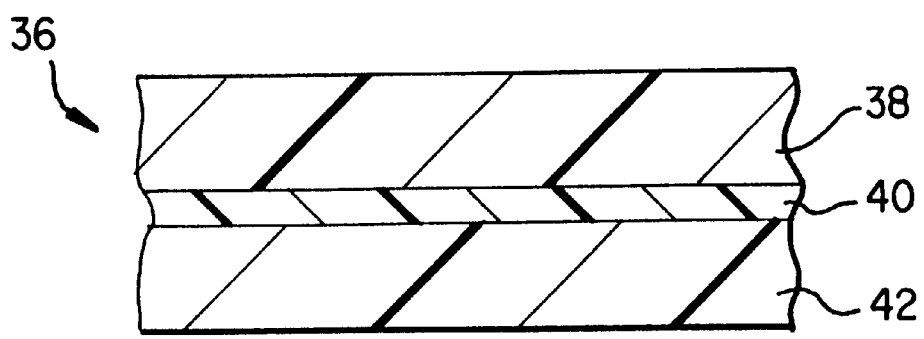
FIG. 3A illustrates a cross-sectional view of a preferred multilayer film suitable for use as the patch in the patch-bag according to FIG. 1.

FIG. 3A illustrates a cross-sectional view of preferred 3-layer film 36 for use as the stock material from which patches 24 and 26 can be cut. First layer 38 serves as an outside and puncture-resistant layer; second layer 40 serves as a tie layer and is preferably made up of two identical layers bonded to one another; third layer 42 serves as an inside layer and a puncture-resistant layer.

Figure 3B:
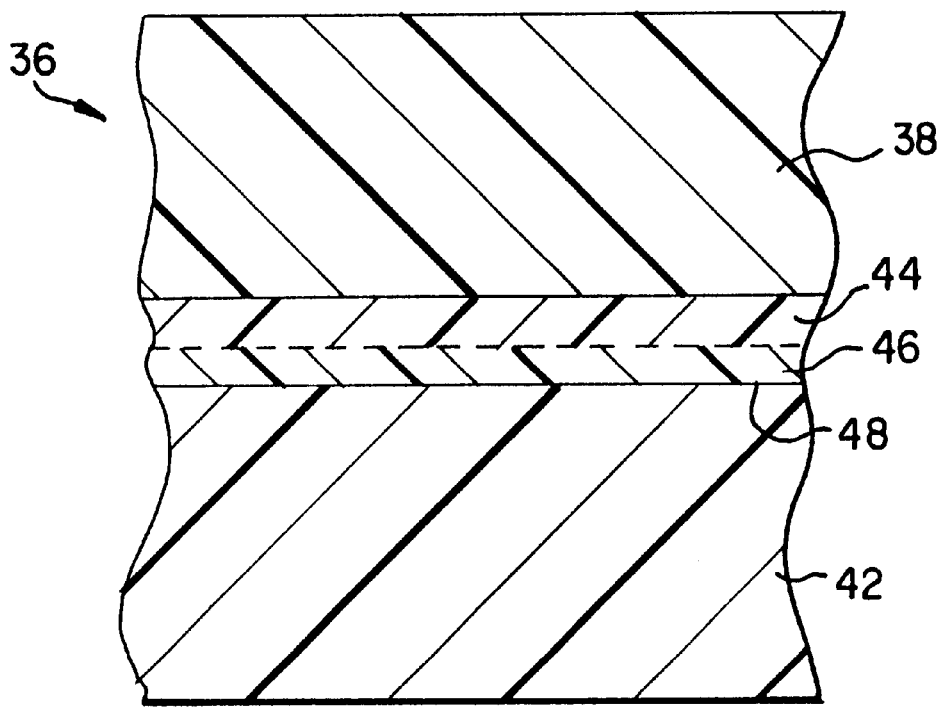
FIG. 3B illustrates an enlarged cross-sectional view of the multilayer film of FIG. 3A.

FIG. 3B illustrates an enlarged cross-sectional view of the film of FIG. 3A, including second layer 40 illustrated as being composed of identical film inner layers 44 and 46 adhering to one another. Inner layers 44 and 46 are preferably formed by collapsing a multilayer film tube having an inside layer which can be adhered to itself, resulting in what can be considered to be either a single central film layer, or a pair of identical film layers which are adhering to one another. Hence FIG. 3A illustrates patch film 36 as a three layer film, whereas FIG. 3B illustrates the same film as a four layer film, with the two inner layers being adhered to one another as represented by dotted line 48 because layers 44 and 46 can be considered to form a single layer since they are identical in thickness and chemical composition, due to the process used to make the film. The process illustrated in FIG. 4, described in detail below, can be used to produce the film of FIG. 3B.

Figure 3C:
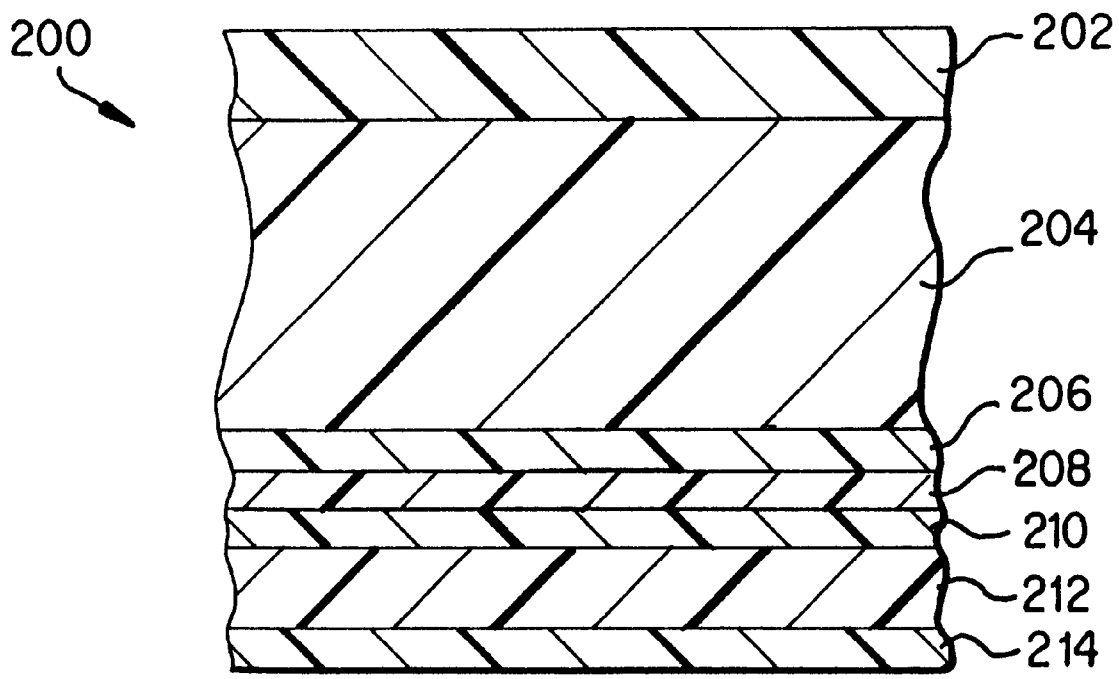
FIG. 3C illustrates a schematic cross-sectional view of a multilayer film described in Patch Film No. 19.

FIG. 3C illustrates a cross-sectional view of an alternative multilayer film 200 which can be used as stock material for preparing a patch for the patch bag of the present invention. Multilayer film 200 is a 7-layer film, and is described in detail in Patch Film No. 19, below. Multilayer film 200 is composed of outer layer 202, bulk layer 204, tie layer 206, $O_2$-barrier layer 208, tie layer 210, bulk layer 212, and outer layer 214.

Figure 4:
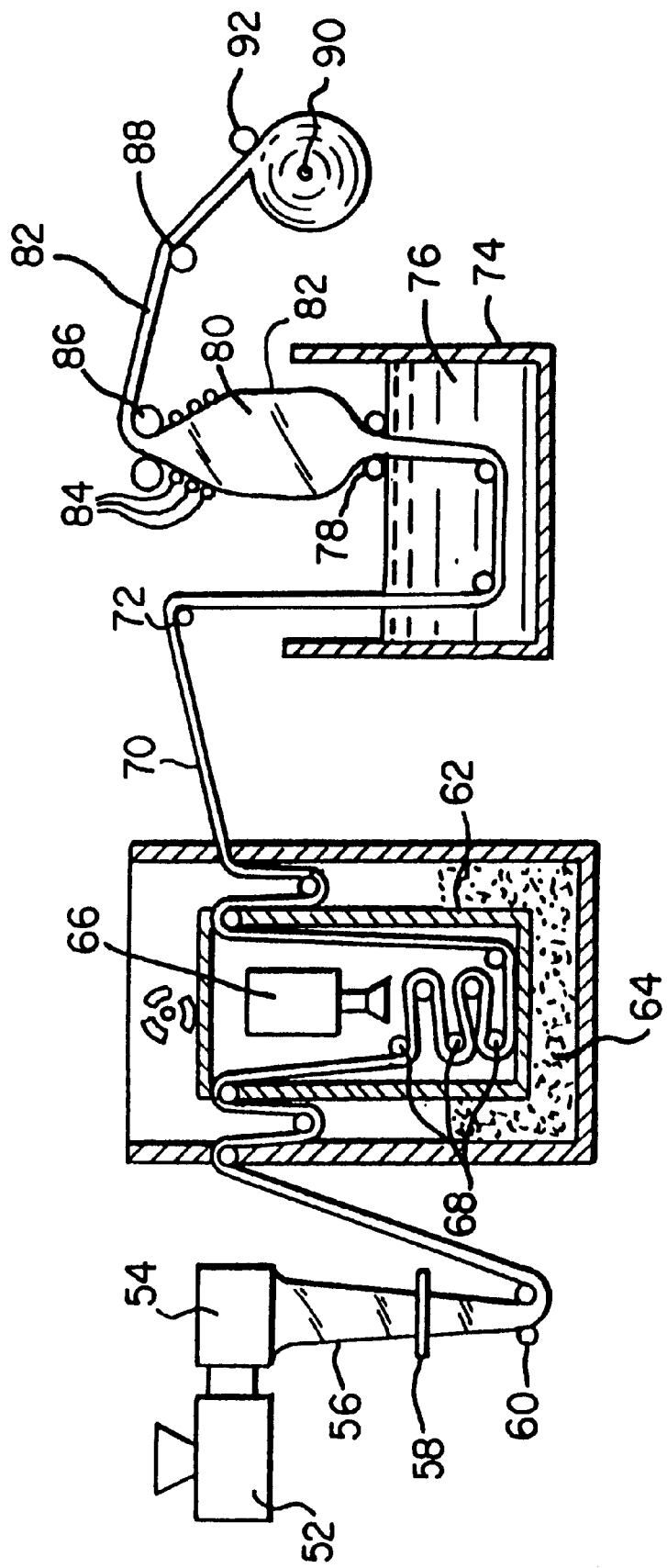
FIG. 4 illustrates a schematic view of a preferred process for making the multilayer film of FIG. 3.

FIG. 4 illustrates a schematic of a preferred process for producing the multilayer films of FIGS. 3A, 3B, and 3C. In the process illustrated in FIG. 4, solid polymer beads (not illustrated) are fed to a plurality of extruders 52 (for simplicity, only one extruder is illustrated). Inside extruders 52, the polymer beads are forwarded, melted, and degassed, following which the resulting bubble-free melt is forwarded into die head 54, and extruded through annular die, resulting in tubing 56 which is 5–40 mils thick, more preferably 20–30 mils thick, still more preferably, about 25 mils thick.

After cooling or quenching by water spray from cooling ring 58, tubing 56 is collapsed by pinch rolls 60, and is thereafter fed through irradiation vault 62 surrounded by shielding 64, where tubing 56 is irradiated with high energy electrons (i.e., ionizing radiation) from iron core transformer accelerator 66. Tubing 56 is guided through irradiation vault 62 on rolls 68. Preferably, the irradiation of tubing 56 is at a level of from about 2 to 10 megarads (hereinafter "MR").

After irradiation, irradiated tubing 70 is directed over guide roll 72, after which irradiated tubing 70 passes into hot water bath tank 74 containing water 76. The now collapsed irradiated tubing 70 is submersed in the hot water for a retention time of at least about 5 seconds, i.e., for a time period in order to bring the film up to the desired temperature, following which supplemental heating means (not illustrated) including a plurality of steam rolls around which irradiated tubing 70 is partially wound, and optional hot air blowers, elevate the temperature of irradiated tubing 70 to a desired orientation temperature of from about 240° F.–250° F. Thereafter, irradiated film 70 is directed through nip rolls 78, and bubble 80 is blown, thereby transversely stretching irradiated tubing 70. Furthermore, while being blown, i.e., transversely stretched, irradiated film 70 is drawn (i.e., in the longitudinal direction) between nip rolls 78 and nip rolls 86, as nip rolls 86 have a higher surface speed than the surface speed of nip rolls 78. As a result of the transverse stretching and longitudinal drawing, irradiated, biaxially-oriented, blown tubing film 82 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16.

While bubble 80 is maintained between pinch rolls 78 and 86, blown tubing 82 is collapsed by rolls 84, and thereafter conveyed through pinch rolls 86 and across guide roll 88, and then rolled onto wind-up roller 90. Idler roll 92 assures a good wind-up.

The invention is illustrated by the following examples, i.e., patch films, which are provided for the purpose of representation, and are not to be construed as limiting the scope of the invention. Unless stated otherwise, all percentages, parts, etc. are by weight.

Patch Film Nos. 1, 2, 4, and 6–14, 16–17, and 19 are patch films which can be used to make a patch for a patch bag according to the present invention. Patch Film Nos. 3, 5, 15, and 18 are comparative patch films to be contrasted to patch films which can be used to make the patch bag of the present invention.

Patch Film No. 1

A coextruded, two-ply tubular tape was cast, the tape having a thickness of 29 mils, the tape having an A layer making up 85 percent of the tape thickness, and a B layer making up 15 percent of the tape thickness. The A Layer was composed of: (a) 87 weight percent DOWLEX 2045™ linear low density polyethylene having a density of 0.920 g/cc, obtained from The Dow Chemical Company, of Midland, Mich. (hereinafter "LLDPE #1"), (b) 10 weight percent ELVAX 3128™ ethylene/vinyl acetate copolymer having a vinyl acetate content of 10 percent, obtained from DuPont, of Wilmington, Del., hereinafter "EVA #1", and (c) 3 weight percent TEKNOR EPE-9621C™ antiblock agent, obtained from Teknor Apex Plastics Division, of Pawtucket, R.I., hereinafter "Antiblock #1". The B Layer contained 100 weight percent EXACT SLP 4008 linear homogeneous ethylene/alpha-olefin plastomer having a density of 0.885 g/cc, obtained from the Exxon Chemical Company, of Baytown, Tex. (hereinafter, "linear homogeneous ethylene/ alpha olefin #1").

The two-ply tubing was cooled to a solid phase in a water bath and then electronically crosslinked with a 500 Kev beam to a level of from about 2 to 10 MR. The resulting crosslinked two-ply tubing was heated by steam cans and hot air at about 210–220° F., and was subsequently oriented by being drawn and stretched approximately 350%, in each of the machine and transverse directions, respectively, using a trapped bubble of air held between two nip rolls. The orientation produced a 2.25 mil two-ply film in the form of a tube.

After drawing, the resulting tube of hot-water-shrinkable flat film was passed through a pair of nip rolls, causing the inside B layer to bond to itself upon tube collapse, rendering a final four-ply film, with the "middle" plies being the inside B layer bonded to itself (i.e., resulting in a "4-ply" film having a thickness of 4.5 mils), as follows:

| A | B | B | A |
|---|---|---|---|
| Blend A | SLP 4008 | SLP 4008 | Blend A |

Table I, immediately below, includes the chemical composition and thickness of each of the layers, together with the function which the layer serves in the patch.

TABLE I

| FIG. 3 layer designation | layer function | chemical identity | layer thickness (mils) |
|---|---|---|---|
| 38 | outside layer & puncture-resistant layer | 87% LLDPE #1; 10% EVA #1; 3% Antiblock #1 | 2.0 |
| 40 | tie layer | homogeneous ethylene/ alpha-olefin #1 | 0.7 |
| 42 | inside layer & puncture-resistant layer | 87% LLDPE #1; 10% EVA #1; 3% Antiblock #1 | 2.0 |

Patch Film No. 1 was composed of the above three layers, the middle layer being composed of the inside tube layer adhered to itself. Patch Film No. 1 was determined to have a free shrink at 185° F. (via ASTM 2732), and an instrumented impact, as set forth below in Table II, below. Instrumented impact was measured by a procedure substantially equivalent to ASTM D 3763. ASTM D 3763 is described in the 1990 *Annual Book of ASTM Standards*, Section 8, Plastics, Vol. 08.03, pp. 174–178, which is hereby incorporated by reference thereto, in its entirety.

An alternative to Patch Film No. 1 is a two-layer film having a thickness of about 4.5 mils, with about 85 weight percent of this film having a composition corresponding to layer 38 described in Table I above, and with 15 weight percent of this film having a composition corresponding to layer 40 above. This film could be produced using a flat die, rather than a circular die.

Patch Film No. 2

Patch Film No. 2 was prepared by the same process employed to produce Patch Film No. 1, with the exception that in Patch Film No. 2, the A Layer was composed of a blend of: (a) 87 weight percent LLDPE #1, (b) 10 weight percent EXACT 3032™ linear homogeneous ethylene/ alpha-olefin plastomer having a density of 0.900 g/cc, also obtained from the Exxon Chemical Company (hereinafter, "linear homogeneous ethylene/alpha-olefin copolymer #2), and (c) 3 weight percent Antiblock #1. In Patch Film No. 2, the B Layer remained identical to the B Layer of Patch Film No. 1. Furthermore, as with Patch Film No. 1, in Patch Film No. 2 the A Layer made up 85 percent of the tape thickness, and a B layer made up 15 percent of the tape thickness. The Patch Film No. 2 free shrink and instrumented impact are provided in Table II, below.

Patch Film No. 3 (Comparative)

Patch Film No. 3 was prepared by the same process employed to produce Patch Film No. 1, except that in Patch Film No. 3, the A Layer was composed of a blend of: (a) 87 weight percent LLDPE #1, (b) 10 weight percent ELVAX 3128™ ethylene/vinyl acetate copolymer having a vinyl acetate content of 9 percent and a density of 0.928 g/cc, and a melt index of 2.0, obtained from the DuPont Chemical Co., of Wilmington, Del. (hereinafter referred to as EVA #2), and (c) 3 weight percent Antiblock #1. In Patch Film No. 3, the B Layer was composed of 100 weight percent ELVAX 3175™ ethylene/vinyl acetate copolymer having a vinyl acetate content of 28 percent and a density of 0.950 g/cc, and a melt index of 6.0, obtained from the DuPont Chemical Co., of Wilmington, Del. (hereinafter referred to as EVA #2). Furthermore, as with Patch Film No. 1, in Patch Film No. 3 the A Layer made up 85 percent of the tape thickness, and a B layer made up 15 percent of the tape thickness.

The Patch Film No. 3 free shrink and instrumented impact are provided in Table II, below. Patch Film No. 3 is a comparative patch film because it does not comprise any homogeneous ethylene/alpha-olefin copolymer.

Patch Film No. 4 (Comparative)

Patch Film No. 4 was prepared by the same process employed to produce Patch Film No. 1, except that in Patch Film No. 4, the A Layer was composed of a blend of: (a) 82 weight percent LLDPE #1, (b) 15 weight percent EVA #1, and (c) 3 weight percent Antiblock #1. In Patch Film No. 4, the B Layer was composed of 100 weight percent EVA #2. Furthermore, as with Patch Film No. 1, in Patch Film No. 4 the A Layer made up 85 percent of the tape thickness, and a B layer made up 15 percent of the tape thickness.

The Patch Film No. 4 free shrink and instrumented impact are provided in Table II, below. Patch Film No. 4 is a comparative patch film because it does not comprise any homogeneous ethylene/alpha-olefin copolymer.

Patch Film No. 5

Patch Film No. 5 was prepared by the same process employed to produce Patch Film No. 1, except that in Patch Film No. 5, the A Layer was composed of a blend of: (a) 67 weight percent LLDPE #1; (b) 30 weight percent XU59220.01, a proprietary experimental long chain branched homogeneous ethylene/alpha-olefin copolymer (hereinafter referred to as "homogeneous ethylene/alpha-olefin #3") having a density of 0.901 g/cc and a melt index of 0.9, obtained under a development agreement with The Dow Chemical Company of Midland, Mich.; and, (c) 3 weight percent Antiblock #1. The information concerning XU59220.01 and the evaluation results of film/bag containing the experimental polymer which are set forth in this example have been approved for release by Dow.

In Patch Film No. 5, the B Layer was composed of 100 weight percent EVA #2. Furthermore, as with Patch Film No. 1, in Patch Film No. 5 the A Layer made up 85 percent of the tape thickness, and a B layer made up 15 percent of the tape thickness.

The Patch Film No. 5 free shrink and instrumented impact are provided in Table II, below.

TABLE II

| Film No. | Free Shrink at 185° F. | | Free Shrink at 205° F. | | Impact Strength | Energy to Break |
|---|---|---|---|---|---|---|
| | % MD | % TD | % MD | % TD | (lbs) | (ft-lbs) |
| 1 | 11 | 16 | 20 | 30 | 97 | 4.8 |
| 2 | 11 | 18 | 21 | 32 | 109 | 5.7 |
| 3 (comparative) | 10 | 17 | 20 | 30 | 100 | 5.0 |
| 4 (comparative) | 13 | 18 | 25 | 32 | 87 | 3.1 |
| 5 | 14 | 20 | — | — | 88 | 3.2 |

As can be seen from Table II, the impact strength of various patch films according to the present invention, e.g., Patch Film Nos. 1, 2, and 5, were found to be comparable to the impact strength exhibited by comparative Patch Film No. 3 and comparative Patch Film No. 4, both of which utilize LLDPE as the polymer which provides the patch film with high impact strength. Thus, it has been found that the use of homogeneous ethylene/alpha-olefin copolymers, in accordance with the present invention, can result in a patch film having an impact strength substantially equivalent to, and in some instances even better than, the impact strength of LLDPE-based patch films.

Patch Film No. 6

A coextruded, two-ply, tubular tape was cast, the tape having a thickness of 9 mils, the tape having an A layer making up 85 percent of the tape thickness, and a B layer making up 15 percent of the tape thickness. The A Layer was composed of a blend of: (a) 50 weight percent of a resin composition referred to as ECD 103 linear homogeneous ethylene/hexene copolymer, also obtained from the Exxon Chemical Company (hereinafter referred to as "linear homogeneous ethylene/alpha-olefin #4"), (b) 37 weight percent ECD 106 linear homogeneous ethylene/hexene copolymer, having a density of about 0.917 g/cc, and a melt index of about 3, also obtained from the Exxon Chemical Co. (hereinafter referred to as "linear homogeneous ethylene/alpha-olefin #5"), (c) 10 weight percent LD 200.48™ low density polyethylene having a density of 0.917 g/cc and a melt index of 6.7, this low density polyethylene also obtained from the Exxon Chemical Co., and (d) 3 weight percent Antiblock #1. In Patch Film No. 6, the B Layer was composed of 100 weight percent EVA #2.

The two-ply sheet was cooled to a solid phase using a chilled roll, and then electronically crosslinked with a 500 Kev beam to a level of approximately 2 to 10 MR. The resulting crosslinked two-ply sheet was heated with hot air (at 210–220° F.), and was subsequently oriented by drawing and stretching approximately 300 percent in each of the machine and transverse directions, respectively, using a tenter frame, to produce a biaxially oriented film having a thickness of about 1 mil. The impact strength of the resulting Film No. 6 is provided in Table III, below.

Patch Film No. 7

A coextruded, two-ply sheet is cast, the sheet having a thickness of 18 mils, the sheet having an A layer making up 85 percent of the sheet thickness, and a B layer making up 15 percent of the sheet thickness. The A Layer is composed of a blend of: (a) 97 weight percent linear homogeneous ethylene/alpha-olefin #4, and (b) 3 weight percent Antiblock #1. In Patch Film No. 7, the B Layer is composed of 100 weight percent EVA #2.

The two-ply sheet is cooled to a solid phase using a chilled roll, and then electronically crosslinked with a 500 Kev beam to a level of approximately 2 to 10 MR. The resulting crosslinked two-ply sheet is heated with hot air (at 210–220° F.), and is subsequently oriented by drawing and stretching approximately 300 percent in each of the machine and transverse directions, respectively, using a tenter frame, to produce a biaxially-oriented film having a thickness of about 2 mils.

Patch Film No. 8

A single ply sheet is cast, the sheet having a thickness of 18 mils, the sheet being composed of a blend of: (a) 97 weight percent linear homogeneous ethylene/alpha-olefin #4, and (b) 3 weight percent Antiblock #1. After the sheet is cast, the tape is cooled to a solid phase using a chilled roll, and then electronically crosslinked with a 500 Kev beam to a level of approximately 2 to 10 MR. The resulting crosslinked two-ply sheet is heated with hot air (at 210–220° F.), and is subsequently oriented, using a tenter frame, to impart longitudinal orientation in an amount of about 300 percent, and transverse orientation in an amount of about 300 percent, to result in a biaxially oriented film having a thickness of about 2 mils.

Patch Film No. 9

A single ply tubular tape is cast, the tape having a thickness of 27 mils, the tape being composed of a blend of:

(a) 97 weight percent linear homogeneous ethylene/alpha-olefin #4, and (b) 3 weight percent Antiblock #1. After the tape is cast, the tape is cooled to a solid phase using chilled air or chilled water, and then electronically crosslinked with a 500 Kev beam to a level of approximately 2 to 10 MR. The resulting crosslinked tape is then heated with hot air (at 210–220° F.), and is subsequently oriented by drawing and stretching approximately 300 percent in each of the machine and transverse directions, respectively, using a trapped bubble process, to produce a biaxially-oriented film having a thickness of about 3 mils. The tubular film is thereafter slit to form a flat film suitable for use as a patch on a patch bag.

Patch Film No. 10

Patch Film No. 10 was prepared by the same process employed to produce Patch Film No. 6, except that in Patch Film No. 10, the A Layer was composed of a blend of: (a) 67 weight percent LLDPE #1, (b) 30 weight percent ENGAGE EG 8100™ long chain branched homogeneous ethylene/alpha-olefin copolymer, also obtained from The Dow Chemical Company (hereinafter referred to as "homogeneous ethylene/alpha-olefin #6), and (c) 3 weight percent Antiblock #1. In Patch Film No. 10, the B Layer was composed of 100 weight percent EVA #2. Furthermore, as with Patch Film No. 6, in Patch Film No. 10 the A Layer made up 85 percent of the tape thickness, and a B layer made up 15 percent of the tape thickness.

The Patch Film No. 10 instrumented impact is provided in Table III, below.

Patch Film No. 11

Patch Film No. 11 was prepared by the same process employed to produce Patch Film No. 6, except that in Patch Film No. 11, the A Layer was composed of a blend of: (a) 67 weight percent LLDPE #1, (b) 30 weight percent ENGAGE EG 8150™ long chain branched homogeneous ethylene/alpha-olefin copolymer, also obtained from The Dow Chemical Company (hereinafter referred to as "homogeneous ethylene/alpha-olefin #7), and (c) 3 weight percent Antiblock #1. In Patch Film No. 11, the B Layer was composed of 100 weight percent EVA #2. Furthermore, as with Patch Film No. 6, in Patch Film No. 11 the A Layer made up 85 percent of the tape thickness, and a B layer made up 15 percent of the tape thickness.

The Patch Film No. 11 instrumented impact is provided in Table III, below.

Patch Film No. 12

Patch Film No. 12 was prepared by the same process employed to produce Patch Film No. 6, except that in Patch Film No. 12, the A Layer was composed of a blend of: (a) 50 weight percent of a resin referred to as SLP 9042 linear homogeneous ethylene/alpha-olefin copolymer, obtained from the Exxon Chemical Company (hereinafter referred to as "linear homogeneous ethylene/alpha olefin #8"), (b) 47 weight percent LLDPE #1, and (c) 3 weight percent Antiblock #1. In Patch Film No. 12, the B Layer was composed of 100 weight percent EVA #2. Furthermore, as with Patch Film No. 6, in Patch Film No. 12 the A Layer made up 85 percent of the tape thickness, and a B layer made up 15 percent of the tape thickness.

The Patch Film No. 12 instrumented impact is provided in Table III, below.

Patch Film No. 13

Patch Film No. 13 was prepared by the same process employed to produce Patch Film No. 6, except Film No. 13 was a three-ply tubular film in which the A Layer made up 35 percent of the thickness of the film, the B Layer made up 50 percent of the thickness of the film, and the C Layer made up 15 percent of the thickness of the film. The A Layer was composed of a blend of: (a) 94 weight percent AFFINITY HF 1031™ long chain branched homogeneous ethylene/alpha-olefin also obtained from The Dow Chemical Company (hereinafter referred to as "long chain branched homogeneous ethylene/alpha-olefin copolymer #9"), and (b) 6 percent Antiblock #1. The B Layer was composed of 100 percent AFFINITY 1570™ long chain branched homogeneous ethylene/alpha-olefin copolymer, obtained from The Dow Chemical Company (hereinafter, "ethylene/alpha-olefin #10"). The C Layer was composed of 100 weight percent EVA #2.

The Patch Film No. 13 instrumented impact is provided in Table III, below.

Patch Film No. 14

Patch Film No. 14 was a three-ply film prepared by the same process employed to produce Patch Film No. 13, except that in Patch Film No. 14, the A Layer was composed of a blend of: (a) 67 weight percent LLDPE #1, (b) 30 weight percent homogeneous ethylene/alpha-olefin #7, and (c) 3 percent Antiblock #1. The B Layer was composed of 100 percent homogeneous ethylene/alpha olefin #7, and the C Layer was composed of 100 weight percent EVA #2.

The Patch Film No. 14 instrumented impact is provided in Table III, below.

Patch Film No. 15 (Comparative)

Patch Film No. 15 was a two-ply film prepared by the same process employed to produce Patch Film No. 6, except that in Patch Film No. 15, the A Layer was composed of a blend of: (a) 87 weight percent LLDPE #1, (b) 10 weight percent EVA #1, and (c) 3 percent Antiblock #1. The B Layer was composed of 100 weight percent EVA #2. Patch Film No. 15 is a comparative patch film because it does not comprise any homogeneous ethylene/alpha-olefin copolymer.

The Patch Film No. 15 instrumented impact is provided in Table III, below.

TABLE III

| Film No. | Impact Strength (lbs) |
| --- | --- |
| 6 | 19 |
| 10 | 16 |
| 11 | 17 |
| 12 | 15 |
| 13 | 14 |
| 14 | 13 |
| 15 (comparative) | 19 |

As can be seen from Table III, the impact strength of various patch films according to the present invention, e.g., Patch Film Nos. 6 and 10–14, range from a low of 13 lbs to a high of 20 pounds, whereas comparative Patch Film No. 15 had an impact strength of 19 pounds.

Patch Film No. 16

Patch Film No. 16 was prepared by a process similar to the process employed in the production of Patch Film No. 1. Patch Film No. 16 was made by coextruding a tubular film which had an A/B/C structure in the thickness ratio of 15/70/15, respectively. The A Layer was an outside layer composed of: (a) 87 weight percent LLDPE #1; (b) 10 weight percent EVA #1; and (c) 3 weight percent Antiblock #1. The B Layer was a core layer composed of (a) 97 weight percent homogeneous ethylene/alpha-olefin copolymer #10; and, (b) 3 weight percent Antiblock #1. The C Layer was an inside layer composed of 100 weight percent EVA #2.

The coextruded, three-ply tubular tape was cast, the tape having a thickness of 20 mils. The two-ply tubing was cooled to a solid phase in a water bath and then electronically crosslinked with a 500 Kev beam to a level of approximately 12 MR.

The resulting crosslinked two-ply tubing was heated by immersion in a hot water bath having a temperature of about 210° F., and was subsequently oriented by being drawn and stretched approximately 370%, in each of the machine and transverse directions, respectively, using a trapped bubble of air held between two nip rolls, resulting in a three-ply film having a thickness of about 1.46 mils, in the form of a tube.

After drawing, the resulting tube of hot-water-shrinkable flat film was passed through a pair of nip rolls, causing the inside C layer to bond to itself upon tube collapse, rendering a final six-ply patch film having a thickness of about 2.9 mils. Patch Film No. 16 was determined to have a free shrink at 185° F. (determined using ASTM 2732) of about 48 percent, and the instrumented impact of Patch Film No. 16 (determined using ASTM D 3763), was determined to be about 110 pounds.

Patch Film No. 17

Patch Film No. 17 was prepared by a process similar to the process employed in the production of Patch Film No. 16. Patch Film No. 17 was made by coextruding a tubular film which had an A/B/C structure in the thickness ratio of 35/50/15, respectively. The A Layer was an outside layer composed of: (a) 87 weight percent LLDPE #1; (b) 10 weight percent EVA #1; and (c) 3 weight percent Antiblock #1. The B Layer was a core layer composed of (a) 97 weight percent long chain branched homogeneous ethylene/alpha-olefin copolymer #3; and, (b) 3 weight percent Antiblock #1. The C Layer was an inside layer composed of 100 weight percent EVA #2.

The coextruded, three-ply tubular tape was cast, the tape having a thickness of 20 mils. The two-ply tubing was cooled to a solid phase in a water bath and then electronically crosslinked with a 500 Kev beam to a level of from about 2 to 10 MR.

The resulting crosslinked two-ply tubing was heated by immersion in a hot water bath having a temperature of about 208° F., and was subsequently oriented by being drawn approximately 340% in the machine direction and stretched approximately 370%, in the transverse direction, using a trapped bubble of air held between two nip rolls, resulting in a three-ply film having a thickness of about 1.6 mils, in the form of a tube.

After drawing, the resulting tube of hot-water-shrinkable flat film was passed through a pair of nip rolls, causing the inside C layer to bond to itself upon tube collapse, rendering a final six-ply patch film having a thickness of about 3.2 mils. Patch Film No. 17 was determined to have a free shrink at 185° F. (determined using ASTM 2732) of about 57 percent, and the instrumented impact of Patch Film No. 17 (determined using ASTM D 3763), was determined to be about 63 pounds. It is believed that Patch Film No. 17 would have been considerably greater if the orientation had been carried out at a temperature of about 195° F., as the homogeneous polymer's density of 0.9016 permitted the lower orientation temperature.

Patch Film No. 18 (Comparative)

Patch Film No. 18 was a comparative with respect to Patch Film Nos. 16 and 17. Patch Film No. 18 was prepared by a process similar to the process employed in the production of Patch Film Nos. 16 and 17. Patch Film No. 18 was made by coextruding a tubular film which had an A/B/C structure in the thickness ratio of 15/70/15, respectively. The A Layer was an outside layer composed of: (a) 87 weight percent LLDPE #1; (b) 10 weight percent EVA #1; and (c) 3 weight percent Antiblock #1. The B Layer was identical, in chemical composition, to the A Layer. The C Layer was an inside layer composed of 100 weight percent EVA #2.

The coextruded, three-ply tubular tape was cast, the tape having a thickness of 20 mils. The two-ply tubing was cooled to a solid phase in a water bath and then electronically crosslinked with a 500 Kev beam to a level of from about 2 to 10 MR.

The resulting crosslinked two-ply tubing was heated by immersion in a hot water bath having a temperature of about 210° F., and was subsequently oriented by being drawn approximately 360% in the machine direction and stretched approximately 370%, in the transverse direction, using a trapped bubble of air held between two nip rolls, resulting in a three-ply film having a thickness of about 1.5 mils, in the form of a tube.

After drawing, the resulting tube of hot-water-shrinkable flat film was passed through a pair of nip rolls, causing the inside C layer to bond to itself upon tube collapse, rendering a final six-ply patch film having a thickness of about 3.0 mils. Patch Film No. 18 was determined to have a free shrink at 185° F. (determined using ASTM 2732) of about 50 percent, and the instrumented impact of Patch Film No. 18 (determined using ASTM D 3763), was determined to be about 100 pounds.

A comparison of Patch Film No. 16 with Patch Film No. 18 reveals that the use of the homogeneous ethylene/alpha-olefin copolymer in the core layer of Patch Film No. 16 produces a patch film having an impact strength of about 10 percent greater than the control. The control is the substantial equivalent of patch films which have been used commercially. The 10 percent increase in the impact strength, which is directly attributable to the use of a homogeneous ethylene/alpha-olefin copolymer, is considered to be a substantial increase over the impact strength of Comparative Patch Film No. 18.

Patch Film No. 19

Figure 6:
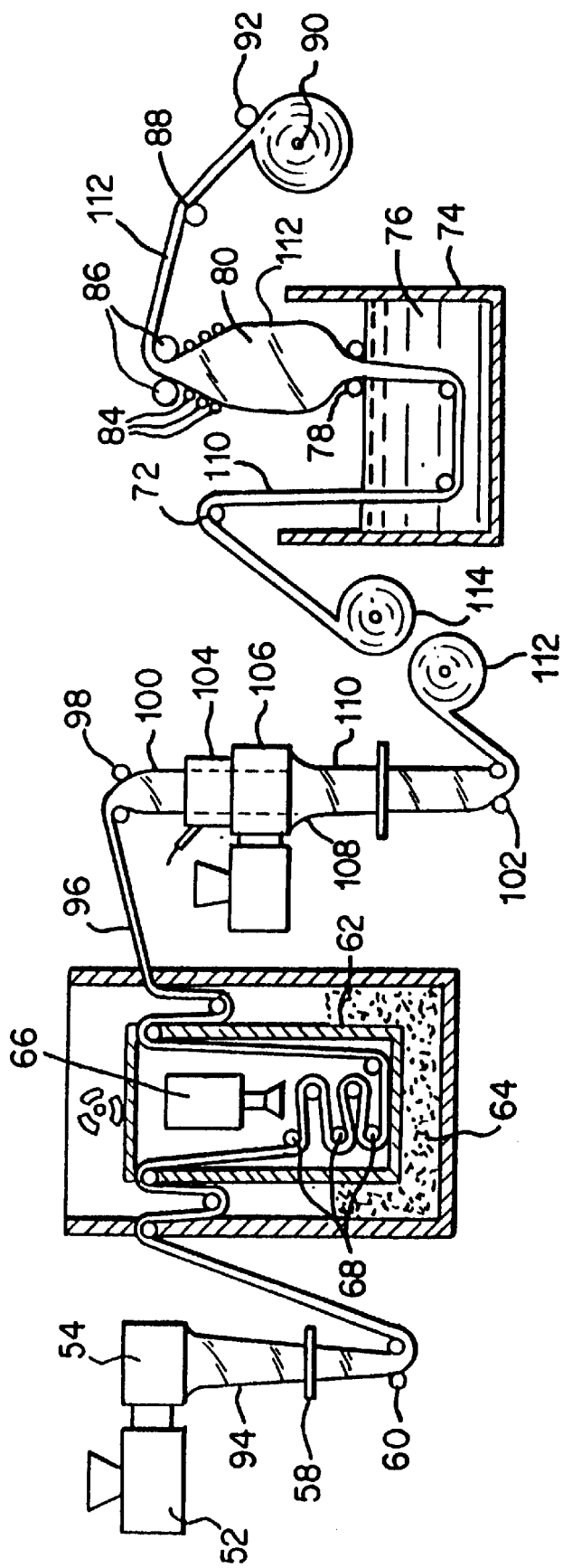
FIG. 6 illustrates a schematic view of a preferred process for making the multilayer film of FIG. 5.

A coextruded, seven-ply tubular tape was cast, the tape having a thickness of 18.6 mils, the tape having an A layer making up 85 percent of the tape thickness, and a B layer making up 15 percent of the tape thickness. The three-ply tubing was cooled to a solid phase in a water bath and then electronically crosslinked with a 500 Kev beam to a level of from about 2 to 10 MR. The resulting crosslinked three-ply tubing was extrusion coated with four additional polymer layers extruded through an annular die, in a process as illustrated in FIG. 6. The resulting 26.5 mil extrusion-coated tape was thereafter immersed in a hot water bath have a temperature of about 192° F., and was subsequently oriented by being drawn approximately 300% in the machine direction, and stretched approximately 325% in the transverse direction, using a trapped bubble of air held between two nip rolls. The orientation produced an approximately 2.7 mil two-ply film in the form of a tube. FIG. 3C is a schematic cross-sectional view of Patch Film No. 19.

Table IV, below, includes the chemical composition and thickness of each of the layers, together with the function which the layer serves in the patch.

TABLE IV

| FIG. 3C layer designation | layer function | chemical identity | layer thickness (mils) |
|---|---|---|---|
| 202 | inside layer | 90% EVA #3 10% LLDPE #1 | 0.36 |
| 204 | bulk | homogeneous ethylene/ alpha-olefin copolymer #11 | 1.39 |
| 206 | tie | EVA #4 | 0.15 |
| 208 | $O_2$-barrier | PVDC Blend #1 | 0.18 |
| 210 | tie | 100% EVA #2 | 0.15 |
| 212 | bulk | homogeneous ethylene/ alpha-olefin copolymer #11 | 0.30 |
| 214 | outside layer | 92.5% EVA #5 7.5% LLDPE #1 | 0.17 |

EVA #3 was PE 3507-2™ ethylene/vinyl acetate copolymer having a vinyl acetate content of 6.2%, a melt index of 2.5, and a density of 0.93 g/cc, and was obtained from DuPont. EVA #4 was EP 4062-2™ ethylene/vinyl acetate copolymer having a vinyl acetate content of 15%, a melt index of 2.5, and a density of 0.938 g/cc., and was also obtained from DuPont. EVA #5 was LD-318.92™ ethylene/vinyl acetate copolymer having a vinyl acetate content of 9%, a melt index of 2.0, and a density of 0.93 g/cc, and was obtained from Exxon. PVDC Blend #1 was a composition comprising: (a) about 96 weight percent DOW MA134™ vinylidene chloride/methyl acrylate copolymer having a methyl acrylate content of 8.5%, obtained from The Dow Chemical Company, of Midland, Mich.; (b) about 2 weight percent PLAS CHEK 775™ epoxidized soybean oil, obtained from Ferro Chemicals, of Bedford, Ohio; and, (c) about 2 weight percent METABLEN L1000™ acrylate blend, obtained from Elf Atochem, of Philadelphia, Penn. METABLEN L1000™ comprises about 53 weight percent methyl methacrylate ("MMA"), 29 weight percent butyl methacrylate ("BMA"), and 19 weight percent butyl acrylate ("BA").

For Patch Film No. 19, which was composed of two films each of which had a thickness of about 2.7 mils (i.e., a total thickness of about 5.4 mils) and each of which was composed of the above-described seven layers, the free shrink at 185° F. (determined using ASTM 2732) was about 75 percent, and the instrumented impact was about 112 pounds of force, and an energy to break of about 5 ft-lbs.

Preferably, the stock film from which the bag is formed has a total thickness of from about 1.5 to 5 mils; more preferably, about 2.5 mils. Although the film stock from which the bag is formed can be a monolayer film, preferably the film stock from which the bag is formed is a multilayer film having from 3 to 7 layers; more preferably, 4 layers. Preferably, the bag film comprises an $O_2$-barrier layer, preferably as a core layer.

In a preferred patch bag according to the present invention, the bag film, i.e., the second heat-shrinkable film, comprises: (A) an outside layer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer; (B) a core $O_2$ barrier layer comprising at least one member selected from the group consisting of ethylene/vinyl alcohol copolymer, polyvinyl chloride, polyvinylidene chloride, polyamide, polyester, polyacrylonitrile; and (C) an inside layer comprising at least one member selected from the group consisting of thermoplastic polyolefin, thermoplastic polyamide, thermoplastic polyester, and thermoplastic polyvinyl chloride.

Figure 5:
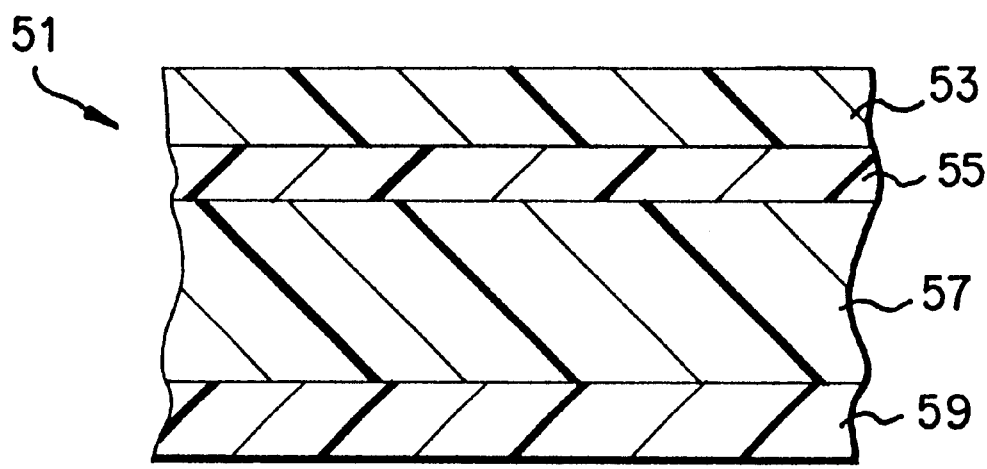
FIG. 5 illustrates a cross-sectional view of a preferred multilayer film suitable for use as the bag in the patch-bag according to FIG. 1.

FIG. 5 illustrates a cross-sectional view of preferred four-layer film 51 for use as the tubing film stock from which, from which, for example, bag portion 22 of preferred end-seal patch bag 20 (illustrated in FIGS. 1 and 2), can be formed. Multilayer film 51 can have, for example, a physical structure, in terms of number of layers, layer thickness, and layer arrangement and orientation in the patch bag, and a chemical composition in terms of the various polymers, etc. present in each of the layers, as set forth in Table V, below.

TABLE V

| FIG. 5 layer designation | layer function | chemical identity | layer thickness (mils) |
|---|---|---|---|
| 53 | outside layer & abuse layer | EVA #1 | 0.56 |
| 55 | barrier layer | 96% VDC/MA #1; 2% epoxidized soybean oil; 2% butyl acrylate/methyl acrylate/butyl methacrylate terpolymer | 0.2 |
| 57 | puncture-resistant layer | 80% LLDPE #1 20% EBA #1 | 1.25 |
| 59 | sealant layer & inside layer | EVA #1 | 0.33 |

EVA #1 was the same ethylene/vinyl acetate copolymer described above. VDC/MA #1 was SARAN MA-134™ vinylidene chloride/methyl acrylate copolymer, obtained from The Dow Chemical Company. The epoxidized soybean oil was PLAS-CHEK 775™ epoxidized soybean oil, obtained from the Bedford Chemical Division of Ferro Corporation, of Walton Hills, Ohio. Bu-A/MA/bu-MA terpolymer was METABLEN L-1000™ butyl acrylatelmethyl methacrylate/butyl methacrylate terpolymer, obtained from Elf Atochem North America, Inc., of 2000 Market Street, Philadelphia, Penn. 19103. EBA #1 was EA 705–009™ ethylene/butyl acrylate copolymer containing 5% butyl acrylate, obtained from the Quantum Chemical Company of Cincinnati, Ohio. Alternatively, EBA #1 can be EA 719–009™ ethylene/butyl acrylate copolymer, having a butyl acrylate content of 18.5%, also obtained from Quantum Chemical Company. Optionally, the linear low density polyethylene of the bag film can be replaced with a homogeneous ethylene/alpha-olefin copolymer.

FIG. 6 illustrates a schematic of a preferred process for producing the multilayer film of FIG. 5. In the process illustrated in FIG. 6, solid polymer beads (not illustrated) are fed to a plurality of extruders 52 (for simplicity, only one extruder is illustrated). Inside extruders 52, the polymer beads are forwarded, melted, and degassed, following which the resulting bubble-free melt is forwarded into die head 54, and extruded through an annular die, resulting in tubing 94 which is 10–30 mils thick, more preferably 15–25 mils thick.

After cooling or quenching by water spray from cooling ring 58, tubing 94 is collapsed by pinch rolls 60, and is thereafter fed through irradiation vault 62 surrounded by shielding 64, where tubing 94 is irradiated with high energy electrons (i.e., ionizing radiation) from iron core transformer accelerator 66. Tubing 94 is guided through irradiation vault 62 on rolls 68. Preferably, tubing 94 is irradiated to a level of from about 2 to 10 MR.

After irradiation, irradiated tubing 96 is directed through pinch rolls 98, following which tubing 96 is slightly inflated, resulting in trapped bubble 100. However, at trapped bubble 100, the tubing is not significantly drawn longitudinally, as the surface speed of nip rolls 102 are about the same speed as nip rolls 98. Furthermore, irradiated tubing 96 is inflated only enough to provide a substantially circular tubing without significant transverse orientation, i.e., without stretching.

Slightly inflated, irradiated tubing 96 is passed through vacuum chamber 104, and thereafter forwarded through coating die 106. Second tubular film 108 is melt extruded from coating die 106 and coated onto slightly inflated, irradiated tube 96, to form two-ply tubular film 110. Second tubular film 108 preferably comprises an $O_2$ barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 110 is wound up onto windup roll 112. Thereafter, windup roll 112 is removed and installed as unwind roll 114, on a second stage in the process of making the tubing film as ultimately desired. Two-ply tubular film 110, from unwind roll 114, is unwound and passed over guide roll 72, after which two-ply tubular film 110 passes into hot water bath tank 74 containing water 76. The now collapsed, irradiated, coated tubular film 110 is submersed in hot water 76 (having a temperature of about 210° F.) for a retention time of at least about 5 seconds, i.e., for a time period in order to bring the film up to the desired temperature for biaxial orientation. Thereafter, irradiated tubular film 110 is directed through nip rolls 78, and bubble 80 is blown, thereby transversely stretching tubular film 110. Furthermore, while being blown, i.e., transversely stretched, nip rolls 86 draw tubular film 110 in the longitudinal direction, as nip rolls 86 have a surface speed higher than the surface speed of nip rolls 78. As a result of the transverse stretching and longitudinal drawing, irradiated, coated biaxially-oriented blown tubing film 112 is produced, this blown tubing preferably having been both stretched in a ratio of from about 1:1.5–1:6, and drawn in a ratio of from about 1:1.5–1:6. More preferably, the stretching and drawing are each performed a ratio of from about 1:2–1:4. The result is a biaxial orientation of from about 1:2.25–1:36, more preferably, 1:4–1:16. While bubble 80 is maintained between pinch rolls 78 and 86, blown tubing 112 is collapsed by rolls 84, and thereafter conveyed through pinch rolls 86 and across guide roll 88, and then rolled onto wind-up roller 90. Idler roll 92 assures a good wind-up.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

The multilayer films used to make the patch bag of the present invention are preferably irradiated to induce crosslinking, as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons is applied to the film. Preferably, irradiation is carried out by an electron accelerator and the dosage level is determined by standard dosimetry methods. Other accelerators such as a Vander Graff or resonating transformer may be used. The radiation is not limited to electrons from an accelerator since any ionizing radiation may be used. The ionizing radiation crosslinks the polymers in the film. Preferably, the film is irradiated at a level of from 2–15 MR, more preferably 2–10 MR. As can be seen from the descriptions of preferred films for use in the present invention, the most preferred amount of radiation is dependent upon the film and its end use.

The corona treatment of a film is preformed by subjecting the surfaces of the film to corona discharge, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

Although corona treatment is a preferred treatment of the multilayer films used to make the patch bag of the present invention, plasma treatment of the film may also be used.

Figure 7:
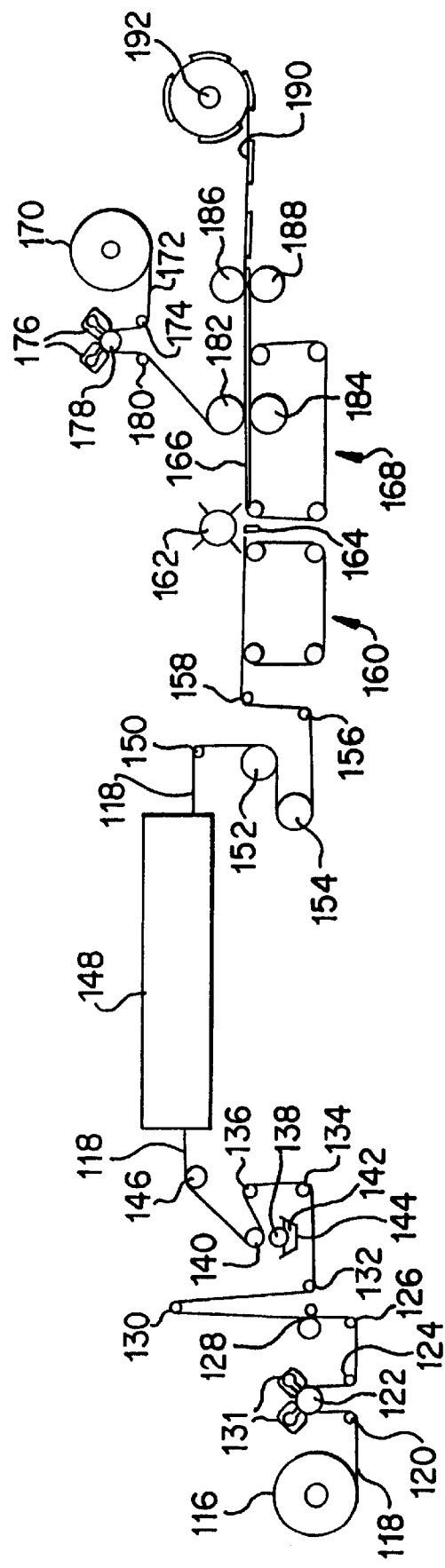
FIG. 7 illustrates a schematic view of a preferred process for making the patch bag of FIG. 1, using the films of FIGS. 3 and 5, as respectively produced by the processes of FIGS. 4 and 6.

A preferred patch bag of the present invention, as illustrated for example in FIGS. 1 and 2, can be manufactured by a preferred process as illustrated in FIG. 7. The process of FIG. 7 can be summarized as follows.

In general, a patch bag can be manufactured by carrying out the following process. First, a thermoplastic film is extruded, and thereafter oriented in a machine direction and a transverse direction, so that a first biaxially-oriented, heat-shrinkable, thermoplastic patch film is produced. Then, the patch film is cut into a plurality of patches which are then adhered to a tubing, following which the tubing, having the patch adhered thereto, is formed into a bag. Alternatively, but less preferably, the patch can be adhered to a pre-formed bag.

A preferred process for producing the patch bag of the present invention is as follows. First, a heat-shrinkable patch is produced by a process comprising the steps of: (i) coextruding a multilayer, thermoplastic patch tubing, comprising an outside layer and an inside layer, the outside layer comprising homogeneous ethylene/alpha-olefin copolymer and the inside layer comprising a polymer capable of sealing to itself; (ii) applying a sufficient amount of at least one member selected from the group consisting of an inert dust and an inert powder, to an inside surface of the patch tubing, so that upon collapsing the tubing after extrusion, the tubing does not self-adhere; (iii) collapsing the patch tubing; (iv) irradiating the collapsed patch tubing so that polymers making up the patch tubing are crosslinked by the irradiation; (v) opening, inflating, heating, and stretching the patch tubing so that a biaxially-oriented, heat-shrinkable patch tubing is formed; (vi) simultaneously cooling, collapsing, and flattening the biaxially-oriented, heat-shrinkable patch tubing, whereupon the inside layer of the biaxially-oriented, heat-shrinkable patch tubing adheres to itself, resulting in patch film stock. Secondly, a heat-shrinkable bag tubing is prepared in a manner as known to those of skill in the art, for example, by the method illustrated in FIG. 6, described above. Third, adhesive is applied to one side of the patch film stock, and the resulting adhesive-coated patch film stock is cut into a plurality of patches, following which the resulting adhesive-coated patch is adhered to the heat-shrinkable bag tubing. Fourth, the heat-shrinkable bag tubing, having the patch adhered thereto, is cut and sealed, so that a patch bag is formed bag is formed from a portion of the heat shrinkable bag film tubing having the patch adhered thereto.

In this process, preferably the patch tubing is irradiated at a level of from about 2 to 15 MR. The adhesive can comprise any suitable adhesive as known to those of skill in the art. Preferably, two patches are adhered to the heat-shrinkable bag tubing.

Preferably, the tubing having the first and second patches adhered thereto is produced by the process illustrated in FIG. 6, discussed above. In FIG. 7, patch film roll 116 supplies patch film 118. Patch film 118 is directed, by idler roll 120, to corona treatment devices 131 which subject the upper surface of patch film 118 to corona treatment as patch film 118 passes over corona treatment roll 122. After corona treatment, patch film 118 is directed, by idler rolls 124 and 126, into (optional) printing roll 128.

Patch film 118 is thereafter directed over idler rolls 130, 132, 134, and 136, after which patch film 118 is passed through a small gap (i.e., a gap wide enough to accommodate patch film 118 passing therethrough while receiving an amount of adhesive which corresponds with a dry coating, i.e., weight after drying, of about 45 milligrams per 10 square inches of patch film) between adhesive application roll 138 and adhesive metering roll 140. Adhesive application roll 138 is partially immersed in adhesive 142 supplied to trough 144. As adhesive roll 138 rotates counter-clockwise, adhesive 142, picked up by the immersed surface of adhesive roll 138, moves upward, contacts, and is metered onto, the full width of one side of patch film 118, moving in the same direction as the surface of adhesive roll 138. [Examples of suitable types of adhesives include thermoplastic acrylic emulsions, solvent based adhesives and high solids adhesives, ultraviolet-cured adhesive, and electron-beam cured adhesive, as known to those of skill in the art. A preferred adhesive is RHOPLEX N619™ thermoplastic acrylic emulsion, obtained from the Rohm & Haas Company, at Dominion Plaza Suite 545, 17304 Preston Rd., Dallas, Tex. 75252, Rohm & Haas having headquarters at 7th floor, Independence Mall West, Philadelphia, Penn. 19105.] Patch film 118 thereafter passes so far around adhesive metering roll 140 (rotating clockwise) that the adhesive-coated side of patch film 118 is in an orientation wherein the adhesive is on the top surface of patch film 118, as adhesive-coated patch film 118 moves between adhesive metering roll 140 and idler roll 146.

Thereafter, adhesive-coated patch film 118 is directed over drying oven entrance idler roll 146, and passed through oven 148 within which patch film 118 is dried to a degree that adhesive 142 on patch film 118 becomes tacky. Upon exiting oven 148, patch film 118 is directed partially around oven-exit idler roll 150, following which patch film 118 is cooled on chill rolls 152 and 154, each of which has a surface temperature of about 40–45° F., and a diameter of about 12 inches. The cooling of patch film 118 is carried out in order to stabilize patch film 118 from further shrinkage.

Thereafter, patch film 118 is directed, by idler rolls 156 and 158, onto a belt of pre-cutting vacuum conveyor assembly 160, and thereafter forwarded to a rotary scissor-type knife having upper rotary blade assembly 162 and lower blade 164, the knife cutting across the width of patch film 118 in order to form patches 166. Patches 166 are forwarded and held on top of a belt of post-cutting vacuum conveyor assembly 168. While patches 166 are held on the belt of post-cutting vacuum conveyor assembly 168, tubing-supply roll 170 supplies biaxially oriented, lay-flat film tubing 172, which is directed, by idler roll 174, to corona treatment devices 176 which subject the upper surface of lay-flat tubing film 172 to corona treatment as lay-flat tubing film 172 passes over corona treatment roll 178. After corona treatment, lay-flat tubing film 172 is directed, by idler roll 180, partially around the surface of upper pre-lamination nip roll 182, and through the nip between upper prelaminating nip roll 182 and lower prelaminating nip roll 184, the pre-laminating nip rolls being above and below the post-cutting vacuum conveyor belt. Prelaminating nip rolls 182 and 184 position patches 166 onto the now lower, corona-treated outside surface of lay-flat film tubing 172. After passing through the nip between prelaminating nip rolls 182 and 184, lay-flat tubing 172, having patches 166 laminated intermittently thereon, exits off the downstream end of the post-cutting vacuum conveyor assembly 168, and is directed through the nip between upper laminating nip roll 186 and lower laminating nip roll 188, these rolls exerting pressure (about 75 psi) in order to secure patches 166 to lay-flat tubing 172, to result in patch-laminated lay-flat tubing 190. Thereafter, patch-laminated lay-flat tubing 190 is wound up to form rewind roller 192, with rewind roll 192 having the laminated patches thereon oriented towards the outer-facing surface of rewind roll 192.

In a subsequent process not separately illustrated, rewind roll 192 is removed from its winder and is positioned in the place of tubing supply roll 170, and the process of FIG. 7, described immediately above, is repeated, wherein a second set of patches is laminated to patch-laminated lay-flat tubing 192, this second set of patches being applied to the other side of patch-laminated lay-flat tubing 192. Of course, the second set of patches are accurately aligned and registered so that they are substantially aligned with the positioning of the first set of patches laminated to lay-flat tubing film 172. In order to achieve accurate alignment, photosensors (i.e., photoeyes, etc.), not illustrated, are used to detect the location of the patch. An appropriate location for such a photosensor is upstream of upper pre-lamination roll 182, below the patch-laminated lay-flat tubing.

Throughout the process described above, patches 166 can have a width less than, equal to, or greater than, the width of lay-flat tubing film 172, so that the patches respectively: leave uncovered regions along the sides of the bag, go to the edge of the lay-flat tubing, or, overhang the side edges of lay-flat tubing film 172.

Once both sets of patches have been applied to lay-flat tubing film 172, the resulting two-patch tubing is directed into a bag-making machine, in a process not illustrated.

In general, sealing of film to produce a bag can be performed using a hot bar (heat seal) or a nichrome wire fixed to a chilled metal bar (impulse seal), as is known to those of skill in the art, or any other sealing means known to those of skill in the art, such as ultrasonic radiation, radio frequency radiation, and laser. The preferred sealing means is an impulse sealer. Films which are predominantly polyethylene are generally sealed using impulse sealing or hot bar sealing. Both linear and shaped seals can be formed, as is known to those of skill in the art.

In general, sealing and cutting of tubing to produce bags is disclosed in U.S. Pat. Nos. 3,552,090, 3,383,746, and U.S. Ser. No. 844,883, filed Jul. 25, 1969, to OWEN, each of these two U.S. Patents as well as the U.S. Patent application, hereby being incorporated by reference thereto, in their entireties.

Another alternative patch bag which can be used in the present invention is disclosed in U.S. Ser. No. 08/050,942, in the names of G. K. WILLIAMS and S. A. BRADY, filed Apr. 21, 1993, which is hereby incorporated by reference thereto, in its entirety. This application discloses an end-seal patch bag having at least one patch thereon, preferably two patches thereon, wherein the patches are in a "rotated" position when the patch bag is in its lay-flat position. In accordance with the present invention, one or more supplemental seals are made inward of the primary seal in the patch bag disclosed in the WILLIAMS, et. al. application.

The patch bag according to the present invention can also comprise a plurality of overhanging bonded patches, as disclosed in copending U.S. Ser. No. 08/268,087, filed Jun. 28, 1994, entitled "PATCH BAG HAVING OVERHANGING BONDED PATCHES", filed Jun. 28, 1994, in the name of S. BRADY, et. al., the entirety of which is hereby incorporated by reference thereto.

The patch bag according to the present invention can further comprise a primary seal across a portion of the bag which is not covered by a patch, and a secondary seal inward of the primary seal, as disclosed in copending U.S. Ser. No. 08/278,367, entitled "PATCH BAG WITH SUPPLEMENTAL SEAL", filed Jul. 21, 1994, in the name of S. BRADY, et. al., the entirety of which is hereby incorporated by reference thereto.

A more detailed disclosure of this patch bag can be found in copending U.S. Patent Application to OBERLE et. al., entitled "PATCH BAG HAVING CONTINUOUS PATCH". Of course, this feature is useful regardless of whether the patches are overhanging and bonded to one another.

Although in general the bag according to the present invention can be used in the packaging of any product, the bag of the present invention is especially advantageous for the packaging of food products, especially fresh meat products comprising bone. Among the meat products which can be packaged in the films and packages according to the present invention are poultry, pork, beef, lamb, goat, horse, and fish. More specifically, preferred meat products to be packaged in the patch bag of the present invention include ham, spareribs, picnic, back rib, short loin, short rib, whole turkey, and pork loin. The patch bag of the present invention is especially useful for the packaging of a pair of bone-in whole pork loins.

Figure 8:
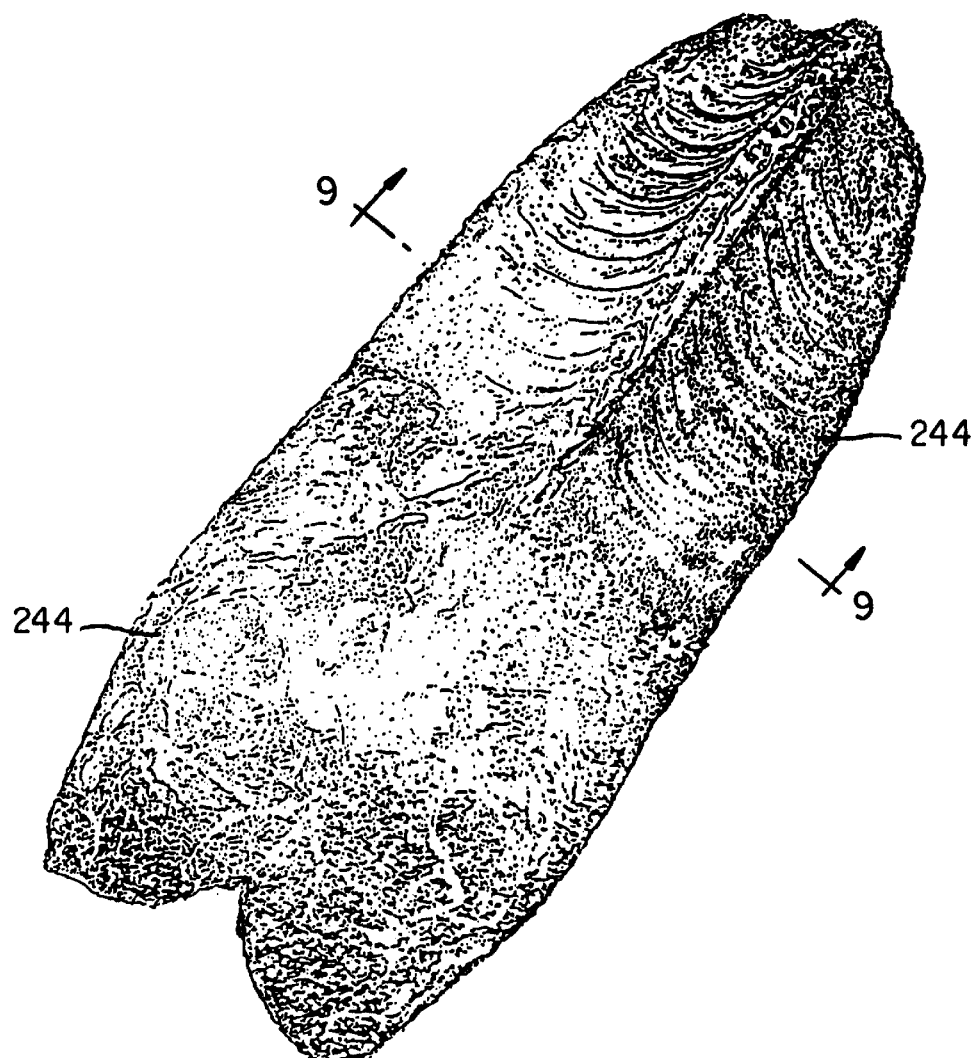
FIG. 8 illustrates a perspective view of a shrunken patch bag containing a pair of fresh, bone-in whole pork loins, each viewed from the ham end.

FIG. 8 illustrates a perspective view of a pair of bone-in whole pork loins 244, each viewed from the ham end, aligned together in a preferred position for packaging in a preferred patch bag as illustrated in FIGS. 1 and 2, as described in detail above. The pair of pork loins as illustrated in FIG. 8 are placed in the patch bag illustrated in FIGS. 1 and 2, with the patch bag thereafter being evacuated, sealed, and shrunken, to result in a packaged product according to the present invention.

Figure 9:
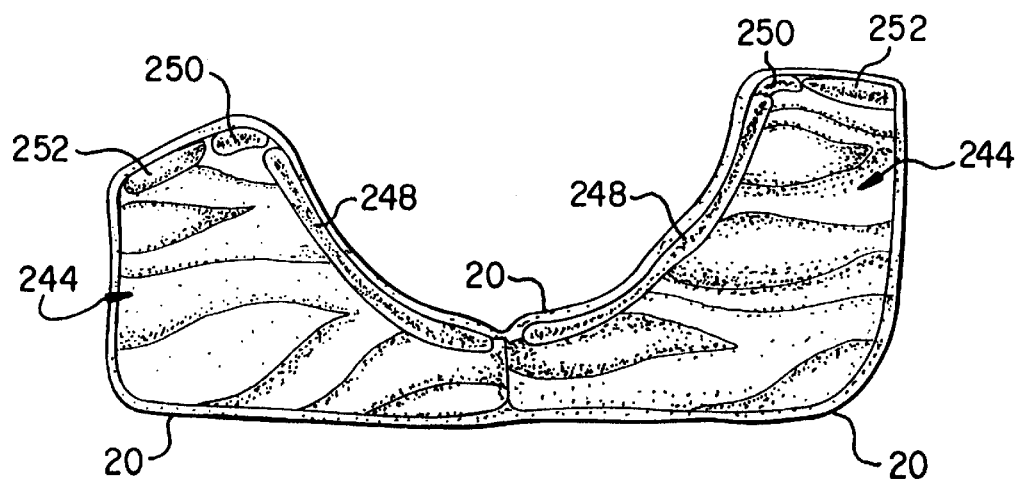
FIG. 9 illustrates a cross-sectional view taken through section 9—9 of FIG. 8, with the addition of a patch bag within which the pair of bone-in pork loins are packaged.

FIG. 9 illustrates a cross-sectional view taken through section 9—9 of FIG. 8, together with the addition of a cross-sectional view of a patch bag 20, i.e., the patch bag illustrated in FIGS. 1 and 2, described above. Each of pork loins 244 contains rib bone 248, chine bone 250, and feather bone 252. It has been found that using a patch bag in which the patches do not extend to the side edges of the bag, but rather extend only up to about one-half inch from the edge of the bag, allow one or more of rib bone 248, chine bone 250, and feather bone 252 to cause bone punctures.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A patch bag comprising a heat-shrinkable patch adhered to a heat-shrinkable bag, the heat-shrinkable patch comprising a first heat-shrinkable film and the heat-shrinkable bag comprising a second heat-shrinkable film, the first heat-shrinkable film comprising homogeneous ethylene/alpha-olefin copolymer wherein the first heat-shrinkable film has a free shrink, at 185° F., of from about 10 to 100 percent.

2. The patch bag according to claim 1, further comprising an adhesive layer between the first heat-shrinkable film and the second heat-shrinkable film.

3. The patch bag according to claim 1, wherein the first film comprises a first homogeneous ethylene/alpha-olefin copolymer, and the second film comprises a second homogeneous ethylene/alpha-olefin copolymer.

4. The patch bag according to claim 3, wherein the first homogeneous ethylene/alpha-olefin copolymer has a density of from about 0.87 to 0.94 g/cc, and the second homogeneous ethylene/alpha-olefin copolymer has a density of from about 0.87 to 0.94 g/cc.

5. The patch bag according to claim 1, wherein the homogeneous ethylene/alpha-olefin copolymer has a density of from about 0.87 to 0.94 g/cc.

6. The patch bag according to claim 1, wherein the homogeneous ethylene/alpha-olefin copolymer comprises long chain branched homogeneous ethylene/alpha-olefin copolymer.

7. The patch bag according to claim 6, wherein the long chain branched homogeneous ethylene/alpha-olefin copolymer has a density of from about 0.87 to 0.94 g/cc.

8. The heat-shrinable patch bag according to claim 1, wherein the first heat-shrinkable film has a free shrink at 185° F., of from about 15 to 75 percent.

9. The heat-shrinkable patch bag according to claim 1, wherein the first heat-shrinkable film has a free shrink, at 185° F., of from about 40 to 120 percent of a free shrink, at 185° F., of the second heat-shrinkable film.

10. The heat-shrinkable patch bag according to claim 9, wherein the first heat-shrinkable film has a free shrink, at 185° F., of from about 40 to 100 percent of a free shrink, at 185° F., of the second heat-shrinkable film.

11. The heat-shrinkable patch bag according to claim 1, wherein the first heat-shrinkable film is a monolayer film.

12. The heat-shrinkable patch bag according to claim 1, wherein the first heat-shrinkable film is a multilayer film.

13. The heat-shrinkable patch bag according to claim 12, wherein the homogeneous ethylene/alpha-olefin is present in the first heat-shrinkable film in an amount of from about 5 to 100 weight percent, based on the weight of the first heat-shrinkable film.

14. The heat-shrinkable patch bag according to claim 12, wherein the first heat-shrinkable film comprises two outer layers and two inner layers, the two outer layers being substantially identical in chemical composition and thickness, and the two inner layers being substantially identical in chemical composition and thickness.

15. The heat-shrinkable patch bag according to claim 14, wherein each of the two outer layers comprises the homogeneous ethylene/alpha-olefin in an amount of from about 1 to 100 weight percent, based on the weight of the outer layers.

16. The heat-shrinkable patch bag according to claim 14, wherein each of the two inner layers comprises the homogeneous ethylene/alpha-olefin in an amount of from about 1 to 100 weight percent, based on the weight of the inner layers.

17. The heat-shrinkable patch bag according to claim 16, wherein each of the two outer layers is substantially free of homogeneous ethylene/alpha-olefin copolymer.

18. The heat-shrinkable patch bag according to claim 15, wherein the homogeneous ethylene/alpha-olefin in the two outer layers has a density of from about 0.87 to 0.94 g/cc.

19. The heat-shrinkable patch bag according to claim 14, wherein the inner layers comprise at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc.

20. The heat-shrinkable patch bag according to claim 19, wherein the ethylene/vinyl ester copolymer comprises at least one member selected from the group consisting of ethylene/methyl acrylate copolymer, and ethylene/vinyl acetate copolymer, and the ethylene/vinyl acid copolymer comprises ethylene/methacrylic acid copolymer.

21. The heat-shrinkable patch bag according to claim 14, wherein the outer layers comprise. from about 10 to 80 weight percent of the weight of the first heat-shrinkable film.

22. The heat-shrinkable patch bag according to claim 1, wherein the second heat-shrinkable film is a multilayer film.

23. The heat-shrinkable patch bag according to claim 22, wherein the second heat-shrinkable film comprises an inner $O_2$-barrier layer.

24. The heat-shrinkable patch bag according to claim 22, wherein the second heat-shrinkable film comprises:

an outside layer comprising at least one member selected from the group consisting of ethylene/alpha-olefin copolymer having a density of from about 0.85 to 0.95, propylenelethylene copolymer, polyamide, ethylene/vinyl acetate copolymer, ethylene/methyl acrylate copolymer, and ethylene/butyl acrylate copolymer;

a core $O_2$ barrier layer comprising at least one member selected from the group consisting of ethylene/vinyl alcohol copolymer, polyvinyl chloride, polyvinylidene chloride, polyamide, polyester, polyacrylonitrile; and an inside layer comprising at least one member selected from the group consisting of thermoplastic polyolefin, thermoplastic polyamide, thermoplastic polyester, and thermoplastic polyvinyl chloride.

25. The patch bag according to claim 1, wherein the patch bag comprises two patches adhered to the bag.

26. The patch bag according to claim 1, wherein the homogeneous ethylene/alpha-olefin copolymer is a reaction product of a polymerization utilizing a metallocene catalyst.

27. A packaged product comprising:

a package including a patch bag comprising a heat-shrinkable patch adhered to a heat-shrinkable bag, the heat-shrinkable patch comprising a first heat-shrinkable film and the heat-shrinkable bag comprising a second heat-shrinkable film, the first heat-shrinkable film comprising a homogeneous ethylene/alpha-olefin copolymer, wherein the first heat-shrinkable film has a free shrink, at 185° F., of from about 10 to 100 percent; and a meat product in the package, the meat product comprising bone.

28. The packaged product according to claim 27, wherein the meat product comprises at least one member selected from the group consisting of ham, spareribs, picnic, back rib, short loin, short rib, whole turkey, pork loin.

29. The patch bag according to claim 1, wherein the second heat-shrinkable film comprises linear low density polyethylene having a density of from about 0.91 to 0.94 g/cc.

30. The patch bag according to claim 1, wherein the first heat-shrinkable film comprises an outer layer comprising linear low density polyethylene, a core layer comprising the homogeneous ethylene/alpha-olefin copolymer, and a self-welded layer comprising ethylene/vinyl acetate copolymer.

31. A patch bag comprising a heat-shrinkable patch adhered to a heat-shrinkable bag, the heat-shrinkable patch comprising a first heat-shrinkable film and the heat-shrinkable bag comprising a second heat-shrinkable film, the first heat-shrinkable film comprising a first layer which is an outer film layer, a second layer which is an inner film layer, and a third film layer which is a self-weld film layer, wherein at least one of the layers comprises homogeneous ethylene/alpha-olefin copolymer, wherein the first heat-shrinkable film has a free shrink, at 185 degree F., of from about 10 to 100 percent.

32. The patch bag according to claim 31, wherein the first heat-shrinkable film comprises six layers and wherein the film is symmetrical with respect to layer thickness and layer composition.

33. The patch bag according to claim 31, wherein the second layer comprises homogeneous ethylene/alpha-olefin copolymer.

34. The patch bag according to claim 31, wherein the first layer comprises homogeneous ethylene/alpha-olefin copolymer.

35. The patch bag according to claim 34, wherein the second layer comprises homogeneous ethylene/alpha-olefin copolymer.

36. The patch bag according to claim 31, wherein the homogeneous ethylene/alpha-olefin copolymer comprises homogeneous long chain branched ethylene/alpha-olefin copolymer.

37. The patch bag according to claim 16, wherein the second layer consists essentially of homogeneous ethylene/alpha-olefin copolymer.

38. The patch bag according to claim 37, wherein the second layer consists of homogeneous ethylene/alpha-olefin copolymer.

39. The patch bag according to claim 1, wherein the first heat-shrinkable film comprises linear homogeneous ethylene/alpha-olefin copolymer in an amount of from about 15 to 85 weight percent.

40. The patch bag according to claim 39, wherein said first heat-shrinkable film is a monolayer film.

41. The patch bag according to claim 39, wherein said first heat-shrinkable film is a multilayer film.

42. The patch bag according to claim 39, wherein the first heat-shrinkable film further comprises heterogeneous ethylene/alpha-olefin copolymer.

43. The patch bag according to claim 39, wherein the first heat-shrinkable film has a thickness of from about 2 to 8 mils.

44. The patch bag according to claim 43, wherein the first heat-shrinkable film has a thickness of from about 3 to 6 mils.

45. The patch bag according to claim 6, wherein the first heat-shrinkable film comprises long chain branched homogeneous ethylene/alpha-olefin copolymer in an amount of from about 5 to 100 percent, based on the weight of the first heat-shrinkable film.

46. The patch bag according to claim 45, wherein said first heat-shrinkable film is a monolayer film.

47. The patch bag according to claim 45, wherein the long chain branched homogeneous ethylene/alpha-olefin copolymer is present in the first heat-shrinkable film in an amount of from about 15 to 85 percent.

48. The patch bag according to claim 1, wherein the first heat-shrinkable film comprises an outer layer comprising heterogeneous ethylene/alpha-olefin copolymer, a self-welded layer, and a core layer between the outer layer and the self-welded layer.

49. The patch bag according to claim 48, wherein the core layer comprises linear homogeneous ethylene/alpha-olefin copolymer.

50. The patch bag according to claim 48, wherein the core layer comprises long chain branched homogeneous ethylene/alpha-olefin copolymer.

51. The patch bag according to claim 1, wherein the first heat-shrinkable film comprises linear homogeneous ethylene/alpha-olefin copolymer in an amount of from about 15 to 100 weight percent, and the heat-shrinkable film has been oriented from a solid phase using a tenter frame.

52. The patch bag according to claim 1, wherein the first heat shrinkable film further comprises ionomer.

53. The patch bag according to claim 52 first heat shrinkable film is a multilayer film.

54. The patch bag according to claim 52, wherein the homogeneous ethylene/alpha-olefin copolymer comprises linear homogeneous ethylene/alpha-olefin copolymer.

55. The patch bag according to claim 52, wherein the homogeneous ethylene/alpha-olefin copolymer comprises homogeneous ethylene/alpha-olefin copolymer having long chain branching.

56. The patch bag according to claim 54, wherein the first heat shrinkable film is a monolayer film.

57. The patch bag according to claim 55, wherein the first heat shrinkable film is a monolayer film.

58. The patch bag according to claim 1, wherein the first heat-shrinkable film further comprises heterogeneous ethylene/alpha-olefin copolymer.

59. The patch bag according to claim 58, wherein the first heat-shrinkable film comprises a blend of a homogeneous ethylene/alpha-olefin copolymer and the heterogeneous ethylene/alpha-olefin copolymer.

60. The patch bag according to claim 58, wherein the first heat-shrinkable film comprises a first layer comprising the linear homogeneous ethylene/alpha-olefin copolymer and a second layer comprising the heterogeneous ethylene/alpha-olefin copolymer.

61. The patch bag according to claim 1, wherein the first heat-shrinkable film comprises a blend of different homogeneous ethylene/alpha-olefin copolymers.

62. The patch bag according to claim 1, wherein the first heat-shrinkable film is formed by a cast extrusion process.

63. The patch bag according to claim 6, wherein the first heat-shrinkable film further comprises heterogeneous ethylene/alpha-olefin copolymer.

64. The patch bag according to claim 6, wherein the first heat-shrinkable film is a monolayer film.

65. The patch bag according to claim 6, wherein the first heat-shrinkable film is a multilayer film.

66. The patch bag according to claim 63, wherein the first heat-shrinkable film comprises a blend of the long chain branched homogeneous ethylene/alpha-olefin copolymer and the heterogeneous ethylene/alpha-olefin copolymer.

67. The patch bag according to claim 63, wherein the first heat-shrinkable film comprises a first layer comprising the long chain branched homogeneous ethylene/alpha-olefin copolymer and a second layer comprising the heterogeneous ethylene/alpha-olefin copolymer.

68. The patch bag according to claim 6, wherein the first heat-shrinkable film comprises a blend of different homogeneous ethylene/alpha-olefin copolymers.

69. The patch bag according to claim 6, wherein the long chain branched homogeneous ethylene/alpha-olefin copolymer is a reaction product of a polymerization utilizing a metallocene catalyst.

70. The patch bag according to claim 6, wherein the first heat-shrinkable film is formed by a cast extrusion process.

71. The patch bag according to claim 52, wherein the first heat-shrinkable film further comprises heterogeneous ethylene/alpha-olefin copolymer.

72. The patch bag according to claim 1, wherein the homogeneous ethylene/alpha-olefin copolymer comprises linear homogeneous ethylene/alpha-olefin copolymer.

73. The patch bag according to claim 72, wherein the linear homogeneous ethylene/alpha-olefin copolymer is a reaction product of a polymerization utilizing a metallocene catalyst.

74. The patch bag according to claim 73, wherein said first heat-shrinkable film is a monolayer film.

75. The patch bag according to claim 73, wherein said first heat-shrinkable film is a multilayer film.

76. The patch bag according to claim 73, wherein the first heat-shrinkable film further comprises heterogeneous ethylene/alpha-olefin copolymer.

77. The patch bag according to claim 76, wherein the first heat-shrinkable film comprises a blend of the linear homogeneous ethylene/alpha-olefin copolymer and the heterogeneous ethylene/alpha-olefin copolymer.

78. The patch bag according to claim 76, wherein the first heat-shrinkable film comprises a first layer comprising the linear homogeneous ethylene/alpha-olefin copolymer and a second layer comprising the heterogeneous ethylene/alpha-olefin copolymer.

79. The patch bag according to claim 73, wherein the first heat-shrinkable film comprises a blend of different homogeneous ethylene/alpha-olefin copolymers.

80. The patch bag according to claim 76, wherein the first heat-shrinkable film is formed by a cast extrusion process.

81. The patch bag according to claim 74 wherein the first heat shrinkable film further comprises a heterogeneous ethylene/alpha-olefin copolymer.

82. The patch bag according to claim 81 wherein the first heat shrinkable film is formed by a cast extrusion process.

83. The patch bag according to claim 1, wherein the heat shrinkable patch has a thickness ranging from 2 to 8 mils.

84. The patch bag according to claim 6, wherein the heat shrinkable patch has a thickness ranging from 2 to 8 mils.

\* \* \* \* \*

(12) EX PARTE REEXAMINATION CERTIFICATE (8195th)
United States Patent
Childress et al.

(10) Number: US 6,287,613 C1
(45) Certificate Issued: May 3, 2011

(54) PATCH BAG COMPRISING HOMOGENEOUS ETHYLENE/ALPHA-OLEFIN COPOLYMER

(75) Inventors: Blaine Clemons Childress, Inman, SC (US); Ronald Dean Moffitt, Spartanburg, SC (US); Timothy Theodore Oberle, Varese (IT)

(73) Assignee: Cryovac, Inc., Duncan, SC (US)

Reexamination Request:
No. 90/006,430, Oct. 30, 2002

Reexamination Certificate for:
Patent No.: 6,287,613
Issued: Sep. 11, 2001
Appl. No.: 08/354,177
Filed: Dec. 12, 1994

(51) Int. Cl.
*B32B 3/08* (2006.01)
*B32B 27/32* (2006.01)
*B65D 75/00* (2006.01)
*C08L 23/08* (2006.01)
*C08L 23/00* (2006.01)

(52) U.S. Cl. .................. 426/129; 426/106; 426/124; 426/127

(58) Field of Classification Search .................. None
See application file for complete search history.

(56) References Cited

U.S. PATENT DOCUMENTS

| | | | |
|---|---|---|---|
| 3,645,992 A | * 2/1972 | Elston | 526/169.2 |
| 4,534,984 A | * 8/1985 | Kuehne | 423/412 |
| 4,770,731 A | * 9/1988 | Ferguson | 156/229 |
| 4,777,095 A | 10/1988 | Kondo et al. | 428/476.1 |
| 4,837,084 A | * 6/1989 | Warren | 428/349 |
| 5,482,770 A | * 1/1996 | Bekele | 428/339 |
| 6,437,064 B1 | * 8/2002 | Eckstein et al. | 526/160 |

OTHER PUBLICATIONS

Dow Affinity™ Polyolefin Plastomers (Aug. 1993 marketing brochure).
Dow Attane™ Ultra Low Density Copolymers for Ultra High Performance (Nov. 1992 marketing brochure).
Exxon Exact™ Polymers (1992 marketing brochure).
"Dow Plastics unveils single-site catalyst resins for packaging," Modern Plastics (Oct. 1993).
"Insite catalysis redefine polyolefin performance," European Plastics News (Oct. 1993).
"Think of AFFINITY as a PVC replacement," Techpak.
"Dow throws its hat in the new-generation polyolefin packaging resins ring," Techpak (Aug. 10, 1992).
"CGC polyolefins are for applications with many major packaging markets," Techpak (Oct. 5, 1992).
"It was a big week for Polyolefin Plastomers—Both the Exxon and Dow kinds," Plastics Focus (1993).
"Exxon gets specific about uses for single-site packaging films," Techpak (Nov. 16, 1992).
"Dow's polyolefin polymers have an affinity for packaging," Techpak (Sep. 20, 1993).

* cited by examiner

*Primary Examiner*—Jerry D. Johnson

(57) ABSTRACT

A patch bag has a heat-shrinkable patch adhered to a heat-shrinkable bag, the heat-shrinkable patch comprising homogeneous ethylene/alpha-olefin copolymer. The patch bag can be made by adhering a patch film to a film which is thereafter converted to a bag, or by adhering the patch to a pre-formed bag. A packaged product has a meat product in the patch bag, the meat product comprising bone.

1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-53 and 58-84 are cancelled.

Claims 54 and 55 are determined to be patentable as amended.

Claims 56 and 57, dependent on an amended claim, are determined to be patentable.

54. [The patch bag according to claim 52, wherein] *A patch bag comprising a heat-shrinkable patch adhered to a heat-shrinkable bag, the heat-shrinkable patch comprising a first heat-shrinkable film and the heat-shrinkable bag comprising a second heat-shrinkable film, the first heat-shrinkable film comprising homogeneous ethylene/alpha-olefin copolymer having a molecular weight distribution $M_w/M_n$ of from about 1.9 to 2.5, wherein the first heat-shrinkable film has a free shrink, at 185° F of from about 10 to 100 percent, and the first heat-shrinkable film further comprises ionomer and* the homogeneous ethylene/alpha-olefin copolymer comprises *linear* homogeneous ethylene/alpha-olefin copolymer.

55. [The patch bag according to claim 52, wherein] *A patch bag comprising a heat-shrinkable patch adhered to a heat-shrinkable bag, the heat-shrinkable patch comprising a first heat-shrinkable film and the heat-shrinkable bag comprising a second heat-shrinkable film, the first heat-shrinkable film comprising homogeneous ethylene/alpha-olefin copolymer having a molecular weight distribution $M_w/M_n$ of from about 1.9 to 2.5, wherein the first heat-shrinkable film has a free shrink, at 185° F of from about 10 to 100 percent, wherein the first heat-shrinkable film further comprises ionomer and* the homogeneous ethylene/alpha-olefin copolymer comprises homogeneous ethylene/alpha-olefin copolymer having long chain branching.

* * * * *